United States Patent
Mizuki et al.

(10) Patent No.: US 10,581,787 B2
(45) Date of Patent: Mar. 3, 2020

(54) SYSTEMS AND METHODS OF FRIEND REGISTRATION

(71) Applicant: NINTENDO CO., LTD., Kyoto (JP)

(72) Inventors: Kiyoshi Mizuki, Kyoto (JP); Kenichi Takemoto, Kyoto (JP)

(73) Assignee: NINTENDO CO., LTD., Kyoto (JP)

(*) Notice: Subject to any disclaimer, the term of this patent is extended or adjusted under 35 U.S.C. 154(b) by 266 days.

(21) Appl. No.: 15/437,614

(22) Filed: Feb. 21, 2017

(65) Prior Publication Data
US 2017/0302611 A1 Oct. 19, 2017

(30) Foreign Application Priority Data
Apr. 13, 2016 (JP) ................................. 2016-080529

(51) Int. Cl.
G06F 15/16 (2006.01)
H04L 12/58 (2006.01)
(Continued)

(52) U.S. Cl.
CPC .............. H04L 51/32 (2013.01); A63F 13/79 (2014.09); G06Q 50/01 (2013.01);
(Continued)

(58) Field of Classification Search
CPC ..... H04L 51/32; H04L 67/10; H04L 65/1063; H04L 61/1594; H04L 67/306; G06Q 50/01; A63F 13/79; A63F 13/795
(Continued)

(56) References Cited

U.S. PATENT DOCUMENTS

| 9,749,366 B1* | 8/2017 | Ramalingam .......... G06Q 50/01 |
| 2005/0091272 A1* | 4/2005 | Smith ..................... G06Q 10/06 |

(Continued)

FOREIGN PATENT DOCUMENTS

| EP | 2477135 | 7/2012 |
| JP | 2011-030733 | 2/2011 |

(Continued)

OTHER PUBLICATIONS

Extended European Search Report dated Apr. 6, 2017, issued in corresponding European Application No. 17156229.1 (7 pages).

(Continued)

*Primary Examiner* — Liang Che A Wang
*Assistant Examiner* — Johnny B Aguiar
(74) *Attorney, Agent, or Firm* — Nixon & Vanderhye P.C.

(57) ABSTRACT

Receiving unit 111 of exemplary friend candidate management server 10 receives from a first information-processing device, identification information of another user registered by executing a first program. Storage unit 12 stores the received identification information of the other user. Sending unit 113, for presenting to a user by executing a second program different from the first program, sends to the first information-processing device or a second information-processing device different from the first information-processing device, the identification information of the other user stored in the storage unit or another item of identification information corresponding to the identification information of the other user. The identification information of the other user is registered in the first information-processing device as friend information of the user based on a mutual agreement between the user and the other user.

13 Claims, 14 Drawing Sheets

(51) Int. Cl.
*A63F 13/79* (2014.01)
*G06Q 50/00* (2012.01)
*H04L 29/06* (2006.01)
*H04L 29/08* (2006.01)
*A63F 13/795* (2014.01)

(52) U.S. Cl.
CPC .......... *H04L 65/1063* (2013.01); *H04L 67/10* (2013.01); *A63F 13/795* (2014.09)

(58) Field of Classification Search
USPC ....... 709/203, 204, 206, 213, 217, 219, 223, 709/205; 705/319
See application file for complete search history.

(56) References Cited

U.S. PATENT DOCUMENTS

| | | | | |
|---|---|---|---|---|
| 2007/0061330 | A1* | 3/2007 | Newton | G06Q 10/10 |
| 2011/0004561 | A1* | 1/2011 | Shahine | G06Q 10/107 |
| | | | | 705/319 |
| 2011/0025820 | A1* | 2/2011 | Fisher | H04L 67/24 |
| | | | | 348/14.08 |
| 2012/0311036 | A1* | 12/2012 | Huhn | G06Q 10/10 |
| | | | | 709/204 |
| 2012/0322560 | A1* | 12/2012 | Joo | A63F 13/35 |
| | | | | 463/42 |
| 2013/0097529 | A1* | 4/2013 | Postoaca | G06Q 50/01 |
| | | | | 715/753 |
| 2013/0165234 | A1* | 6/2013 | Hall | A63F 13/00 |
| | | | | 463/42 |
| 2013/0318085 | A1* | 11/2013 | Pepper | G06Q 10/10 |
| | | | | 707/737 |
| 2013/0325999 | A1 | 12/2013 | Mizuki et al. | |
| 2013/0331179 | A1* | 12/2013 | Taylor | G06Q 10/10 |
| | | | | 463/29 |
| 2014/0189019 | A1* | 7/2014 | Hudack | H04L 67/306 |
| | | | | 709/206 |
| 2014/0351338 | A1 | 11/2014 | Kaneoka et al. | |
| 2014/0351339 | A1* | 11/2014 | Kaneoka | G06Q 50/10 |
| | | | | 709/204 |
| 2015/0074254 | A1* | 3/2015 | Vinner | H04L 61/1594 |
| | | | | 709/223 |
| 2015/0215261 | A1* | 7/2015 | Zhang | G06Q 10/10 |
| | | | | 709/206 |

FOREIGN PATENT DOCUMENTS

| | | |
|---|---|---|
| JP | 2013-225290 | 10/2013 |
| JP | 2013-250783 | 12/2013 |
| WO | WO 2013/016687 | 1/2013 |
| WO | WO-2015131272 A1 * | 9/2015 ............ G06Q 50/01 |

OTHER PUBLICATIONS

Japanese and English translation of Notice of Reasons for Refusal for Japanese Application No. 2016-080529, nine pages, dated Dec. 23, 2019.

European Office Action for European Application No. 17156229.1, five pages, dated Nov. 28, 2019.

\* cited by examiner

FIG. 3A

| FOR MANAGEMENT | | FOR APPLICATION P1 | | FOR APPLICATION P2 | | FOR APPLICATION P3 (SNS) | | SHARED BY APPLICATIONS P4 AND P5 | |
|---|---|---|---|---|---|---|---|---|---|
| USER ID | USER NAME | USER ID | USER NAME | USER ID | USER NAME | USER ID | USER NAME | USER ID | USER NAME |
| ... | ... | ... | ... | ... | ... | ... | ... | ... | ... |
| M003 | C1 | P103 | C2 | P203 | C3 | S003 | C4 | G003 | C5 |
| M004 | D1 | P104 | D2 | P204 | D3 | S004 | D4 | G004 | D5 |
| M005 | E1 | P105 | E2 | P205 | E3 | S005 | E4 | G005 | E5 |
| ... | ... | ... | ... | ... | ... | ... | ... | ... | ... |

121

| USER ID FOR MANAGEMENT | USER NAME | FOR APPLICATION P1 | | FOR APPLICATION P2 | | FOR APPLICATION P3 (SMS) | | SHARED BY APPLICATIONS P4 AND P5 | | APPLICATION NAME | FRIENDSHIP ESTABLISHING METHOD |
|---|---|---|---|---|---|---|---|---|---|---|---|
| | | USER ID | USER NAME | USER ID | USER NAME | USER ID | USER NAME | USER ID | USER NAME | | |
| M001 | A1 | P102 | B2 | P202 | B3 | S002 | B4 | G002 | B5 | P1 | FACE-TO-FACE |
| | | P103 | C2 | P203 | C3 | S003 | C4 | G003 | C5 | P2 | NON-FACE-TO-FACE |
| | | P110 | J2 | P210 | J3 | S010 | J4 | G010 | J5 | P1 | FACE-TO-FACE |
| | | ... | ... | ... | ... | ... | ... | ... | ... | ... | ... |
| M002 | B1 | | | | | | | | | | |
| ... | | | | | | | | | | | |

| FOR APPLICATION P1 | | FRIENDSHIP ESTABLISHING METHOD |
|---|---|---|
| USER ID | USER NAME | |
| P102 | B2 | FACE-TO-FACE |
| P104 | D2 | NON-FACE-TO-FACE |

| FOR APPLICATION P | | FRIENDSHIP ESTABLISHING METHOD |
|---|---|---|
| USER ID | USER NAME | |
| P202 | B3 | FACE-TO-FACE |
| P203 | C3 | NON-FACE-TO-FACE |

| SHARED BY APPLICATIONS P4 AND P5 || FRIENDSHIP ESTABLISHING METHOD |
|---|---|---|
| USER ID | USER NAME | |
| G002 | B5 | FACE-TO-FACE |
| G003 | C5 | NON-FACE-TO-FACE |
| G005 | E5 | NON-FACE-TO-FACE |

| FOR MANAGEMENT | | FOR APPLICATION P3 (SNS) | | FRIENDSHIP ESTABLISHING METHOD |
|---|---|---|---|---|
| USER ID | USER NAME | USER ID | USER NAME | |
| M001 | A1 | S002 | B4 | FACE-TO-FACE |
| | | S003 | C4 | NON-FACE-TO-FACE |
| | | S004 | D4 | NON-FACE-TO-FACE |
| M002 | B1 | S010 | J4 | FACE-TO-FACE |
| | | ⋮ | ⋮ | ⋮ |
| ⋮ | ⋮ | | | |

421

| FOR MANAGEMENT | | FOR APPLICATION P1 | | FOR APPLICATION P2 | | FOR APPLICATION P3 (SNS) | | SHARED BY APPLICATIONS P4 AND P5 | | APPLICATION NAME | FRIENDSHIP ESTABLISHING METHOD |
|---|---|---|---|---|---|---|---|---|---|---|---|
| USER ID | USER NAME | USER ID | USER NAME | USER ID | USER NAME | USER ID | USER NAME | USER ID | USER NAME | | |
| M001 | A1 | P102 | B2 | P202 | B3 | S002 | B4 | G002 | B5 | P1 | FACE-TO-FACE |
| | | P103 | C2 | P203 | C3 | S003 | C4 | G003 | C5 | P2 | NON-FACE-TO-FACE |
| | | P104 | D2 | P204 | D3 | S004 | D4 | G004 | D5 | P1 | NON-FACE-TO-FACE |
| | | P110 | J2 | P210 | J3 | S010 | J4 | G010 | J5 | P1 | FACE-TO-FACE |
| | | ... | | | | | | | | ... | |
| M002 | B1 | | | | | | | | | | |
| ... | | | | | | | | | | | |

FIG. 11A

| FOR MANAGEMENT | | FOR APPLICATION P1 | | FOR APPLICATION P2 | | FOR APPLICATION P3 (SNS) | | SHARED BY APPLICATIONS P4 AND P5 | | APPLICATION NAME | FRIENDSHIP ESTABLISHING METHOD |
|---|---|---|---|---|---|---|---|---|---|---|---|
| USER ID | USER NAME | USER ID | USER NAME | USER ID | USER NAME | USER ID | USER NAME | USER ID | USER NAME | | |
| M001 | A1 | P102 | B2 | P202 | B3 | S002 | B4 | G002 | B5 | P1 | FACE-TO-FACE |
| | | P103 | C2 | P203 | C3 | S003 | C4 | G003 | C5 | P2 | NON-FACE-TO-FACE |
| | | P104 | D2 | P204 | D3 | S004 | D4 | G004 | D5 | P1 | NON-FACE-TO-FACE |
| | | P105 | E2 | P205 | E3 | S005 | E4 | G005 | E5 | P4 | NON-FACE-TO-FACE |
| M002 | B1 | P110 | J2 | P210 | J3 | S010 | J4 | G010 | J5 | P1 | FACE-TO-FACE |
| ... | ... | ... | ... | ... | ... | ... | ... | ... | ... | ... | ... |

FIG. 11B

| FOR MANAGEMENT | | FOR APPLICATION P1 | | FRIENDSHIP ESTABLISHING METHOD |
|---|---|---|---|---|
| USER ID | USER NAME | USER ID | USER NAME | |
| M001 | A1 | P102 | B2 | FACE-TO-FACE |
| | | P104 | D2 | NON-FACE-TO-FACE |
| M002 | B1 | P010 | J2 | FACE-TO-FACE |
| ⋮ | ⋮ | ⋮ | ⋮ | ⋮ |

| FOR MANAGEMENT | | FOR APPLICATION P1 | | FOR APPLICATION P3 (SNS) | |
| --- | --- | --- | --- | --- | --- |
| USER ID | USER NAME | USER ID | USER NAME | USER ID | USER NAME |
| ⋮ | ⋮ | ⋮ | ⋮ | ⋮ | ⋮ |
| M003 | C1 | P103 | C2 | S003 | C4 |
| M004 | D1 | P104 | D2 | S004 | D4 |
| M005 | E1 | P105 | E2 | S005 | E4 |
| ⋮ | ⋮ | ⋮ | ⋮ | ⋮ | ⋮ |

*FIG. 16A*

| FOR MANAGEMENT | | FOR APPLICATION P1 | | FOR APPLICATION P3 (SNS) | | APPLICATION NAME | FRIENDSHIP ESTABLISHING METHOD |
| --- | --- | --- | --- | --- | --- | --- | --- |
| USER ID | USER NAME | USER ID | USER NAME | USER ID | USER NAME | | |
| M001 | A1 | P102 | B2 | S002 | B4 | P1 | FACE-TO-FACE |
| | | P103 | C2 | S003 | C4 | P2 | NON-FACE-TO-FACE |
| M002 | B1 | P110 | J2 | S010 | J4 | P1 | FACE-TO-FACE |
| | | ⋮ | ⋮ | ⋮ | ⋮ | ⋮ | ⋮ |
| ⋮ | ⋮ | | | | | | |

*FIG. 16B*

SYSTEMS AND METHODS OF FRIEND REGISTRATION

CROSS REFERENCE TO RELATED APPLICATIONS

The disclosure of Japanese Patent Application No. 2016-80529, filed on Apr. 13, 2016, is incorporated herein by reference.

FIELD

An exemplary embodiment relates to a technique for mutual utilization of information.

BACKGROUND AND SUMMARY

There are known in the art methods for managing information on friends who meet via a social networking service (SNS) or an online game.

An exemplary embodiment provides an information-processing system comprising one or more information-processing devices and a server, wherein: a first information-processing device is configured to send to the server, identification information of another user registered by executing a first program; the server is configured to store in a storage unit, the sent identification information of the other user; the first information-processing device or a second information-processing device different from the first information-processing device is configured to, for presenting to a user by executing a second program different from the first program, receive the identification information of the other user stored in the storage unit or another item of identification information corresponding to the identification information of the other user; and the identification information of the other user is registered in the first information-processing device as friend information of the user based on a mutual agreement between the user and the other user.

BRIEF DESCRIPTION OF THE DRAWINGS

FIG. 3A is a diagram showing an example of user information DB 121.

FIG. 3B is a diagram showing an example of friend candidate DB 122.

FIG. 11A is a diagram showing an example of friend candidate DB 122.

FIG. 11B is a diagram showing an example of friend candidate DB 122.

FIGS. 16A and 16B are diagrams showing an example each of user information DB 722 and friend candidate DB 723.

DETAILED DESCRIPTION OF NON-LIMITING EXAMPLE EMBODIMENTS

1. Embodiment
1-1. Configuration
1-1-1. Configuration of Information-Processing System 1

Figure 1:
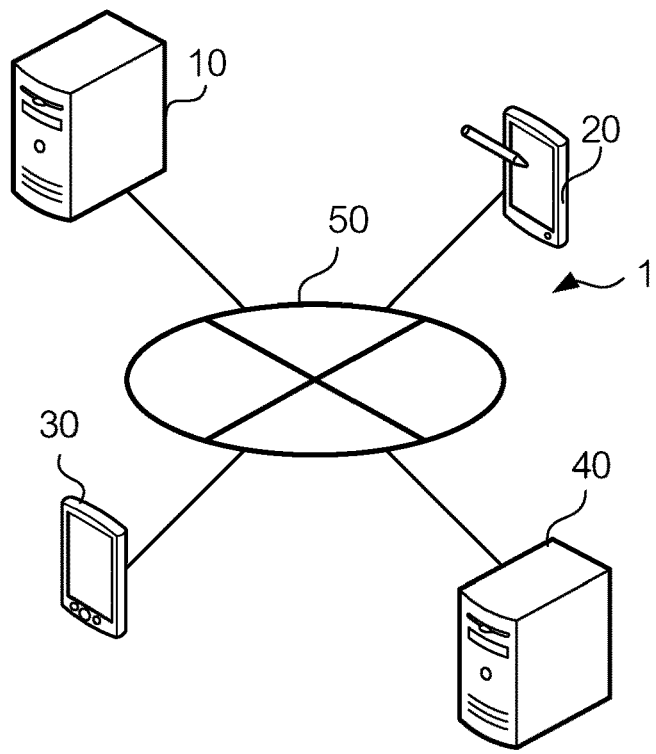
FIG. 1 is a diagram showing an example of a configuration of information-processing system 1.

FIG. 1 is a diagram showing an example of a configuration of information-processing system 1 according to an embodiment of the present invention. Information-processing system 1 includes friend candidate management server 10, communication terminal 20, gaming device 30, and SNS server 40, which devices are interconnected via network 50, which is, for example, the Internet, a mobile communication network, a wireless LAN, or a combination thereof. Information-processing system 1 enables mutual utilization of friend information between plural devices or applications via friend candidate management server 10. Although a single communication terminal 20, a single gaming device 30, and a single SNS server 40 are shown in FIG. 1, plural communication terminals 20, plural gaming devices 30, and plural SNS servers 40 may be connected to network 50.

1-1-2. Configuration of Friend Candidate Management Server 10

Figure 2:
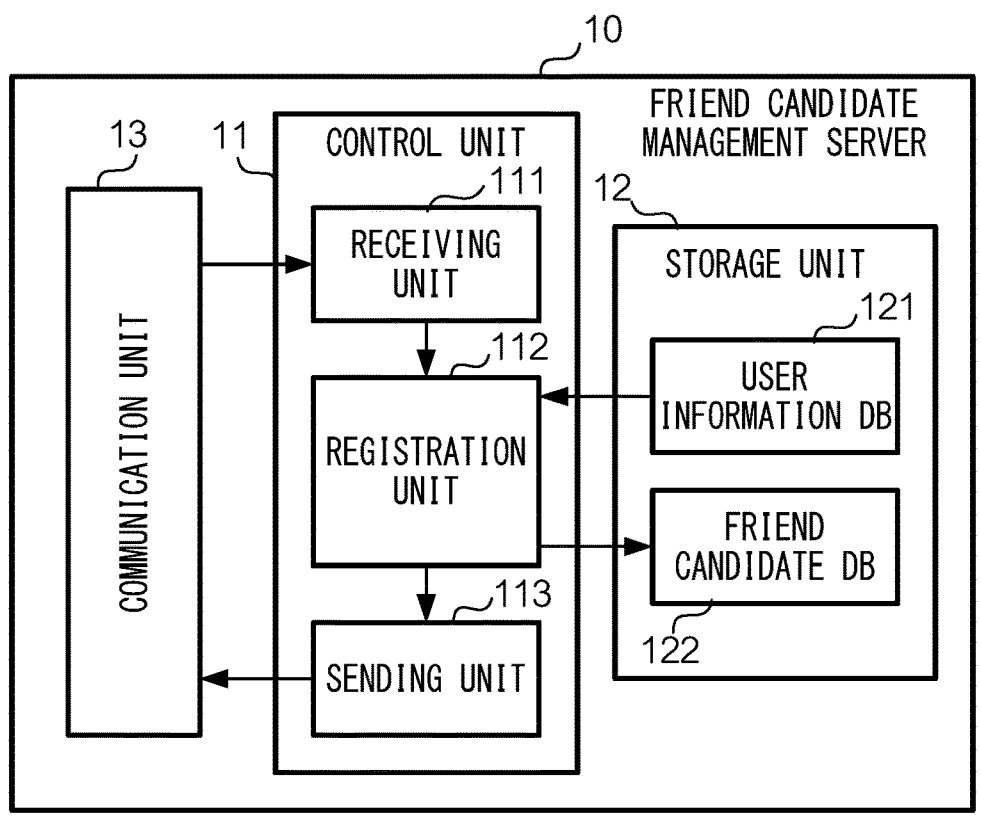
FIG. 2 is a diagram showing an example of a configuration of friend candidate management server 10.

FIG. 2 is a diagram showing an example of a configuration of friend candidate management server 10. Friend candidate management server 10 receives friend information from devices such as communication terminal 20, stores (or accumulates) the received friend information, and makes the stored friend information mutually usable between plural devices or applications. Friend candidate management server 10 includes control unit 11, storage unit 12, and communication unit 13. Control unit 11 includes a computer processor such as a central processing unit (CPU) and a memory, and executes a program stored in storage unit 12. Functions provided by control unit 11 will be described later. Storage unit 12 is a storage device such as a hard disk, and stores programs for execution by control unit 11, user information database (DB) 121, and friend candidate database (DB) 122. The whole or part of storage unit 12 may be provided in network 50.

FIG. 3A is a diagram showing an example of user information DB 121, which is a database for managing different types of identification information for each user utilizing information-processing system 1. User information DB 121 stores, in association with user identification information for management, items of user identification information for an application. Each user identification information includes a user ID, which is an alphanumeric identification number, and a user name, which is a character string representing a user's name such as a nickname. User identification information for management is identification information assigned by friend candidate management server 10 on condition that a user sets up an account for receiving an information-providing service from the server. User identification information for management is identification information for managing items of user identification information for an application, and also identifies a user. User identification information for an application is identification information assigned to a user for an application by, for example, an application server (not shown) or SNS server 40. User identification information for an application is registered by a user in user information DB 121 on an application basis. For example, when an application is running in communication terminal 20 or gaming device 30, user identification information for management and user identification information for the application are sent to friend candidate management server 10 to be registered. It is of note that user identification information to be stored in user information DB 121 may include only a user ID. A user name (a latest version) may be acquired from friend function providing server 70 (described later) each time the user name is needed in friend candidate management server 10.

FIG. 3B is a diagram showing an example of friend candidate DB 122, which is a database for storing friend information received from devices such as communication terminal 20. Friend information stored in friend candidate DB 122 is sent to devices as candidates of friend information. Friend candidate DB 122 stores, in association with user identification information for management, items of friend information for an application, and information relevant to the friend information. Specifically, friend information is user identification information of another user. Further, specifically, information relevant to friend information is an application name, which is identification information of an application that is running when a friendship is established, and establishing-method information indicative of a method by which the friendship is established. It is of note that since an application name is an example of identification information of an application, an application ID may be used instead. It is also of note that another user's user identification information for management may also be stored in association with friend information for an application. It is further of note that date and time information indicative of a data and time at which a friendship is established may also be stored as information relevant to friend information.

A friendship is a relationship established based on a mutual agreement between users. For example, a friendship is established on condition that a user sends a friend request to another user, and the other user approves the friend request. Alternatively, a friendship is established on condition that users exchange friend requests. There are two types of methods for establishing a friendship: one is face-to-face authentication, and the other is non-face-to-face authentication. Face-to-face authentication is a method by which users facing and proximate to each other exchange user identification information. For example, users may exchange user identification information using near field communication such as Bluetooth (registered trademark) or infrared communication. Alternatively, users may exchange user identification information by causing his/her communication terminal 20 to read a two-dimensional code displayed on the other user's communication terminal 20. Alternatively, a server may match communication terminals 20 located close to each other, and the terminals may exchange user identification information via the server. On the other hand, non-face-to-face authentication is a method by which users exchange user identification information, without physically facing each other. For example, users may exchange user identification information via a wide area communication network such as the Internet. Specifically, users may exchange user identification information on condition that a user executes an SNS application to select a friend request button provided on a profile screen of another user. Alternatively, users, by executing an SNS application, may exchange user identification information on a bulletin board. Alternatively, users may exchange user identification information on condition that a user executes a game application to enjoy battle play or collaborative play with another user, and thereafter select a friend request button displayed on the game screen.

Users who have become friends are able to share information with each other. For example, users who have become friend using an SNS application are able to automatically acquire a message posted by another user, or to know whether the other user is logged in. Also, users who have become friends are able to enjoy an application simultaneously. For example, users who have become friends using a game application are able to enjoy battle play or collaborative play together, or to be listed with an identical ranking.

Communication unit 13 is a communication interface for communicating with devices such as communication terminal 20 via network 50.

Control unit 11, by executing a program stored in storage unit 12, provides receiving unit 111, registration unit 112, and sending unit 113.

Receiving unit 111 receives identification information of another user who has registered by executing a program from an information-processing device such as communication terminal 20, gaming device 30, or SNS server 40. The identification information of the other user is user identification information for the program, and friend information registered in the information-processing device based on a mutual agreement between the other user and a user of the information-processing device. Receiving unit 111 receives from the information-processing device, in addition to the identification information of the other user, identification information of the user of the information-processing device, identification information of the program, and information indicative of a method by which the identification information of the other user is registered. The identification information of the user of the information-processing device is user identification information for management. The identification information of the program is an application name. The information indicative of a method by which the identification information of the other user has been registered is establishing-method information indicative of a method by which a friendship has been established.

Registration unit 112 stores (or accumulates) the identification information of the other user received by receiving unit 111 in friend candidate DB 122 stored in storage unit 12. When doing so, registration unit 112 stores the identification information of the other user in friend candidate DB 122 in association with other information received by receiving unit 111, including the identification information of the user of the information-processing device, the identification information of the program, and the establishing-method information indicative of a method by which a friendship has been established. Also, registration unit 112 acquires another item of identification information corresponding to the identification information of the other user from user information DB 121 to store (or accumulate) the acquired identification information in friend candidate DB 122 in association with the identification information of the other user. The other item of identification information is identification information for identifying the other user identified by the identification information of the other user, and is used by a program different from a program that uses the identification information of the other user.

Sending unit 113, for presenting to a user by execution of a program, sends to an information-processing device, identification information of another user stored in friend candidate DB 122 of storage unit 12. When doing so, sending unit 113 sends identification information of another user based on the user's comprehensive agreement each time the program is started. Also, sending unit 113 sends, in addition to identification information of another user, identification information of a program, and establishing-method information indicative of a method by which a friendship has been established. Identification information of another user is, specifically, user identification information for the started program, which user identification information is associated in friend candidate DB 122 with the user to which the identification information is presented. Sending unit 113 sends to the information-processing device, identification information of another user, which information has not yet been registered in the device by execution of the program.

1-1-3. Configuration of Communication Terminal 20

Figures 4, 5A, 5B:
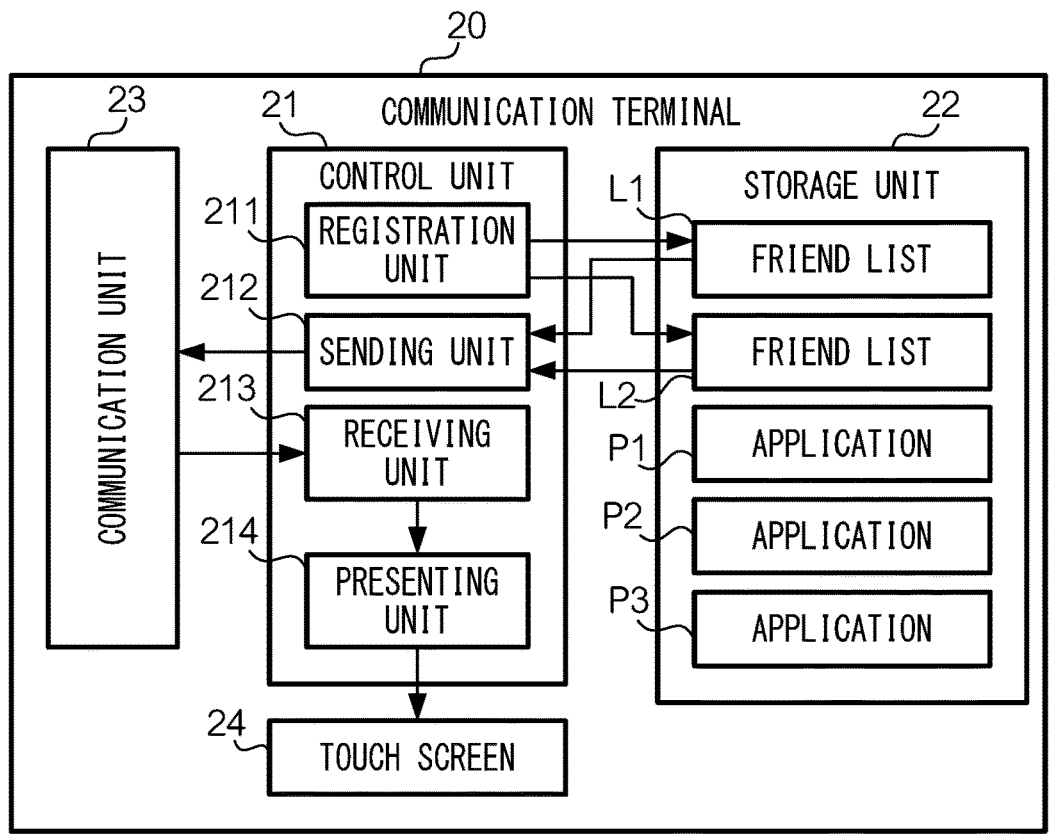
FIG. 4 is a diagram showing an example of a configuration of communication terminal 20.
FIGS. 5A and 5B are diagrams showing an example of friend list L1.

FIG. 4 is a diagram showing an example of a configuration of communication terminal 20. Communication terminal 20 is an information-processing device that exchanges friend information with friend candidate management server 10 for mutual utilization of the friend information between devices or applications. Communication terminal 20 is a mobile information terminal such as a smartphone, a tablet terminal, or a wearable terminal. Communication terminal 20 includes control unit 21, storage unit 22, communication unit 23, and touch screen 24.

Control unit 21 includes a computer processor such as a CPU and a memory, and executes a program stored in storage unit 22. Functions provided by control unit 21 will be described later. Storage unit 22 is a storage device such as a flash memory, and stores applications P1, P2, and P3 for execution by control unit 21, and friend lists L1 and L2. Applications P1 and P2 are, for example, game applications, while application P3 is, for example, an SNS application. Storage unit 22 may store four or more applications.

FIG. 5A is a diagram showing an example of friend list L1, which is a list in which friend information is registered when application P1 is running. Friend list L1 stores friend information for application P1 and establishing-method information indicative of a method by which a friendship has been established, in association with each other. Friend information is, specifically, user identification information of another user. FIG. 5B is a diagram showing an example of friend list L2, which is a list in which friend information is registered when application P2 is running. Friend list L2 stores friend information for application P2 and establishing-method information indicative of a method by which a friendship has been established, in association with each other. Friend information is, specifically, user identification information of another user. In communication terminal 20, a friend list is managed for each application so that a friend list is not shared between applications.

Communication unit 23 is a communication interface for communicating with devices such as friend candidate management server 10 via network 50. Touch screen 24 includes a display panel and a touch sensor placed on top of the display panel. The display panel is, for example, a liquid crystal display or an organic electroluminescence (EL) display. The touch sensor is, for example, a capacitance type touch sensor or a resistive touch sensor.

Control unit 21, by executing application P1, P2, or P3, provides registration unit 211, sending unit 212, receiving unit 213, and presenting unit 214.

Registration unit 211 registers identification information of another user in friend list L1 or L2 as friend information of a user of communication terminal 20. In other words, registration unit 211 stores the identification information of the other user in storage unit 22 in association with information indicating that the identification information is friend information. When registering the identification information of the other user, registration unit 211 performs the registration based on a mutual agreement between the other user and a user of communication terminal 20. Specifically, registration unit 211 performs the registration after one of the users approves a request from the other user. Registration unit 211, when application P1 is running, registers user identification information for application P1 in friend list L1, and when application P2 is running, registers user identification information for application P2 in friend list L2. When registering friend information, registration unit 211 registers it in association with establishing-method information indicative of a method by which a friendship has been established.

Sending unit 212 sends to friend candidate management server 10, identification information of another user registered by executing a program. When doing so, sending unit 212 sends identification information of another user based on a user's comprehensive agreement each time the program is started. Specifically, sending unit 212 sends friend list L1 or L2 stored in storage unit 22 to friend candidate management server 10. When doing so, sending unit 212 sends friend list L1 or L2 together with identification information of the program and the user's identification information for management. Sending unit 212, when application P1 is running, sends friend list L1 together with identification information of application P1, and when application P2 is running, sends friend list L2 together with identification information of application P2.

Also, when identification information of another user is presented by presenting unit 214 as a candidate of friend information, and is selected by the user, sending unit 212 sends a friend request to the other user. The friend request is a request for obtaining the other user's approval for registration of the identification information of the other user as friend information.

Receiving unit 213, for presenting to a user by executing a program, receives from friend candidate management server 10, identification information of another user stored in storage unit 12 (specifically, friend candidate DB 122) of the server. When doing so, receiving unit 213 receives identification information of another user based on the user's comprehensive agreement each time the program is started. Receiving unit 213 also receives, in addition to identification information of another user, identification information of a program and establishing-method-information indicative of a method by which a friendship has been established. Identification information of another user is, specifically, user identification information for the started program. Receiving unit 213 receives identification information of another user, which has not yet been registered in communication terminal 20 through execution of the program.

Presenting unit 214 presents to a user, identification information of another user received by receiving unit 213, as a candidate of friend information. When doing so, presenting unit 214 presents to the user, in addition to the identification information of the other user, other information received by receiving unit 213, including identification information of a program and establishing-method information indicative of a method by which a friendship has been established. Presenting unit 214 causes touch screen 24 to display the items of information.

1-1-4. Configuration of Gaming Device 30

Figures 6, 7:
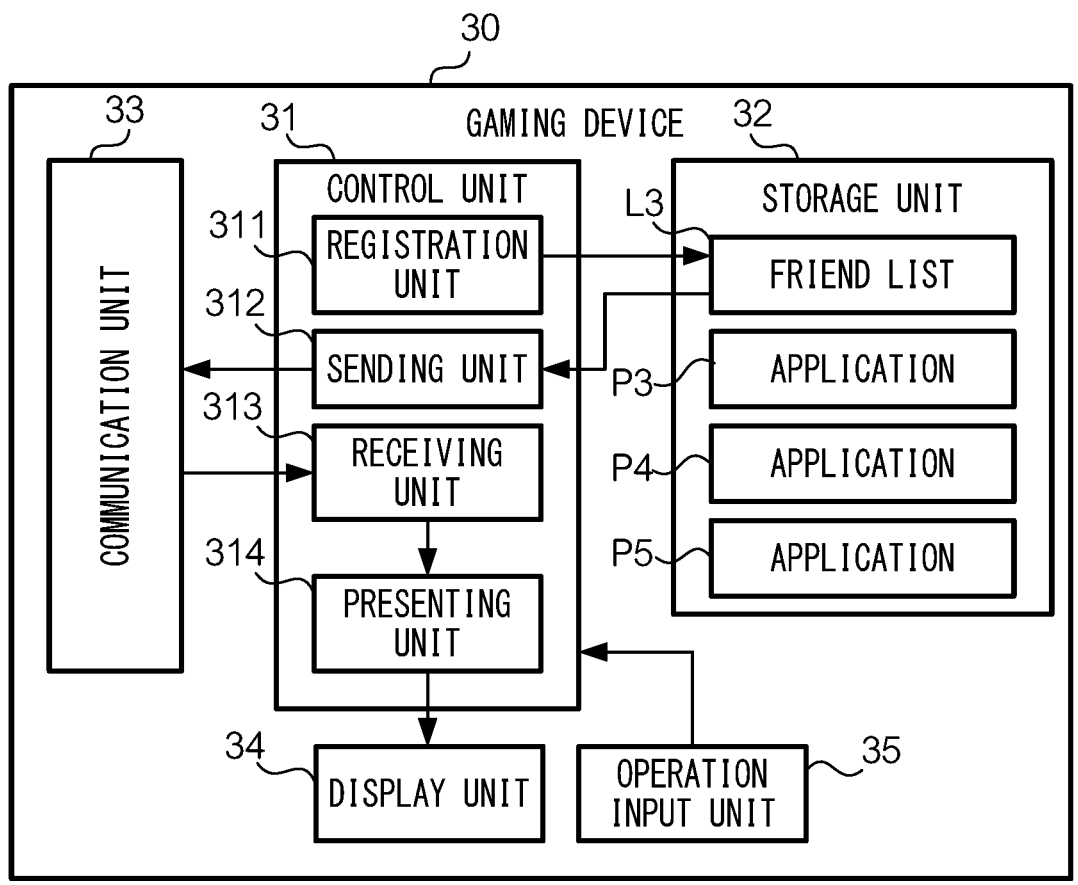
FIG. 6 is a diagram showing an example of gaming device 30.
FIG. 7 is a diagram showing an example of friend list L3.

FIG. 6 is a diagram showing an example of a configuration of gaming device 30. Gaming device 30 is an information-processing device that exchanges friend information with friend candidate management server 10 to mutually utilize friend information between devices. Gaming device 30 is, specifically, a portable or stationary game machine. Gaming device 30 includes a platform different from that of communication terminal 20. Specifically, gaming device 30 includes an operating system (OS) and a hardware environment, types of which are different from those of communication terminal 20. Gaming device 30 includes control unit 31, storage unit 32, communication unit 33, display unit 34, and operation input unit 35.

Control unit 31 includes a computer processor such as a CPU and a memory, and executes a program stored in storage unit 32. Functions provided by control unit 31 will be described later. Storage unit 32 is a storage device such as a flash memory or a hard disk, and stores applications P3, P4, and P5 for execution by control unit 31, and friend list L3. Application P3 is an SNS application, while applications P4 and P5 are, for example, game applications. Storage unit 32 may store four or more applications.

FIG. 7 is a diagram showing an example of friend list L3, which is a list in which friend information is registered when application P4 or P5 is running. Friend list L3 stores friend information commonly used in application P4 and P5 and establishing-method information indicative of a method by which a friendship has been established, in association with each other. Friend information is user identification information of another user. In gaming device 30, friend information for plural applications is managed by a single friend list so that a friend list is shared between applications.

Communication unit 33 is a communication interface for communicating with devices such as friend candidate management server 10 via network 50. Display unit 34 is, for example, a liquid crystal display or an organic EL display. Operation input unit 35 is, for example, a capacitance type or resistive touch sensor, or operation keys. Display unit 34 and operation input unit 35 may be separated from gaming device 30.

Control unit 31, by executing application P3, P4, or P5, provides registration unit 311, sending unit 312, receiving unit 313, and presenting unit 314.

Registration unit 311 registers identification information of another user in friend list L3 as friend information of a user of gaming device 30. In other words, registration unit 311 stores the identification information of the other user in storage unit 32 in association with information indicating that the identification information is friend information. When registering the identification information of the other user, registration unit 311 performs the registration based on a mutual agreement between the other user and a user of gaming device 30. Specifically, registration unit 311 performs the registration after one of the users approves a request from the other user. When registering friend information, registration unit 311 registers it in association with establishing-method information indicative of a method by which a friendship has been established.

Sending unit 312 sends to friend candidate management server 10, identification information of another user registered by executing a program. When doing so, sending unit 312 sends identification information of another user based on a user's comprehensive agreement each time the program is started. Specifically, sending unit 312 sends friend list L3 stored in storage unit 32 to friend candidate management server 10.

Also, when identification information of another user is presented by presenting unit 314 as a candidate of friend information, and is selected by the user, sending unit 312 sends a friend request to the other user.

Receiving unit 313, for presenting to a user by executing a program, receives from friend candidate management server 10, identification information of another user stored in storage unit 12 (specifically, friend candidate DB 122) of the server. When doing so, receiving unit 313 receives identification information of another user based on the user's comprehensive agreement each time the program is started. Receiving unit 313 also receives, in addition to identification information of another user, identification information of a program and establishing-method information indicative of a method by which a friendship has been established. Identification information of another user is, specifically, user identification information for the started program. Receiving unit 313 receives identification information of another user, which has not yet been registered in gaming device 30 through execution of the program.

Presenting unit 314 presents to a user, identification information of another user received by receiving unit 313, as a candidate of friend information. When doing so, presenting unit 314 presents to the user, in addition to the identification information of the other user, other information received by receiving unit 313, including identification information of a program and establishing-method information indicative of a method by which a friendship has been established. Presenting unit 314 causes display unit 34 to display the items of information.

1-1-5. Configuration of SNS Server 40

Figures 8, 9:
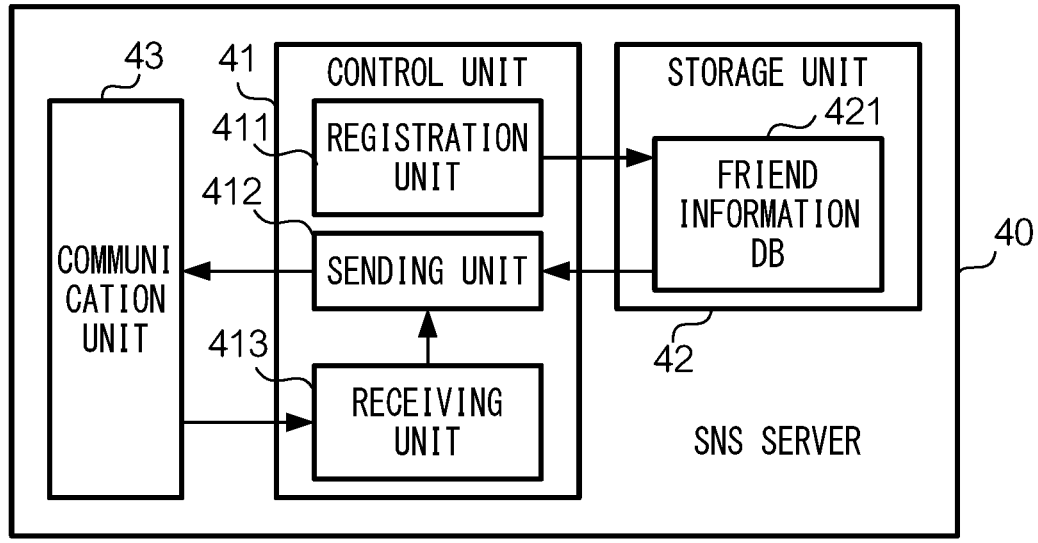
FIG. 8 is a diagram showing an example of a configuration of SNS server 40.
FIG. 9 is a diagram showing an example of friend information DB 421.

FIG. 8 is a diagram showing an example of a configuration of SNS server 40, which provides a social networking service to a user of communication terminal 20 or gaming device 30. SNS server 40 is an information-processing device that exchanges friend information with friend candidate management server 10 to mutually utilize friend information between devices. SNS server 40 includes a platform different from that of communication terminal 20 or gaming device 30. Specifically, SNS server 40 includes an OS and a hardware environment, types of which are different from those of communication terminal 20 or gaming device 30. SNS server 40 includes control unit 41, storage unit 42, and communication unit 43.

Control unit 41 includes a computer processor such as a CPU and a memory, and executes a program stored in storage unit 42. Functions provided by control unit 41 will be described later. Storage unit 42 is a storage device such as a hard disk, and stores programs for execution by control unit 41 and friend information DB 421.

FIG. 9 is a diagram showing an example of friend information DB 421, which is a database for managing friend information registered by executing application P3. Friend information DB 421 stores in association with user identification information for management, friend information for application P3 and establishing-method information indicative of a method by which a friendship has been established. Friend information is, specifically, user identification information of another user.

Communication unit 43 is a communication interface for communicating with devices such as friend candidate management server 10 via network 50.

Control unit 41, by executing a program stored in storage unit 42, provides registration unit 411, sending unit 412, and receiving unit 413.

Registration unit 411 registers identification information of another user in friend information DB 421 as friend information of a user of an information-processing device such as communication terminal 20 or gaming device 30. In other words, registration unit 411 stores the identification information of the other user in storage unit 42 in association with information indicating that the identification information is friend information. When registering the identification information of the other user, registration unit 411 performs the registration based on a mutual agreement between the other user and a user of the information-processing device. Specifically, registration unit 411 performs the registration after one of the users approves a request from the other user. When registering friend information, registration unit 411 registers it in association with establishing-method information indicative of a method by which a friendship has been established.

Sending unit 412 sends to friend candidate management server 10, identification information of another user registered by executing a program. When doing so, sending unit 412 sends identification information of another user based on a comprehensive agreement of a user of an information-processing device each time the program is started by the user. Specifically, sending unit 412 sends friend information of a target user stored in friend information DB 421 to friend candidate management server 10.

Receiving unit 413, for presenting to a user by executing a program, receives from friend candidate management server 10, identification information of another user stored in storage unit 12 (specifically, friend candidate DB 122) of the server. When doing so, receiving unit 413 receives identification information of another user based on a comprehensive agreement of a user of an information-processing device each time the program is started by the user. Receiving unit 413 also receives, in addition to identification information of another user, identification information of a program and establishing-method information indicative of a method by which a friendship has been established. Identification information of another user is, specifically, user identification information for the started program. Receiving unit 413 receives identification information of another user, which has not yet been registered in SNS server 40 (specifically, friend information DB 421) in association with the user of the information-processing device through execution of the program.

1-2. Operation

A friend information mutual utilization operation performed in information-processing system 1 will be described, in which operation friend candidate management server 10 acquires friend information from an information-processing device, and provides the device with candidates of friend information. Described below are three cases: a case where a friend information mutual utilization operation is performed between communication terminal 20 and friend candidate management server 10, a case where a friend information mutual utilization operation is performed between gaming device 30 and a friend candidate management server 10, and a case where friend information mutual utilization operation is performed between SNS server 40 and friend candidate management server 10.

1-2-1. Friend Information Mutual Utilization Operation of Communication Terminal 20

Figure 10:
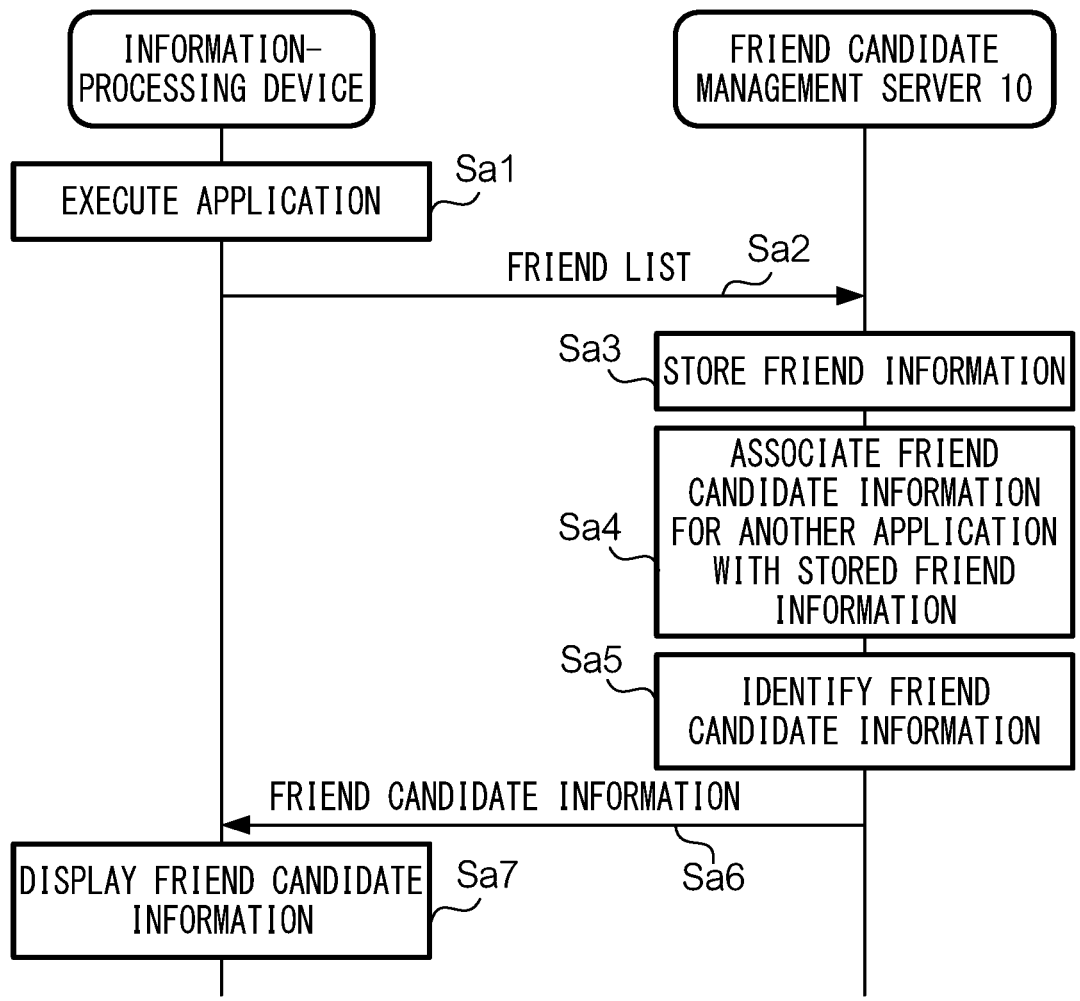
FIG. 10 is a sequence diagram showing an example of a friend information mutual utilization operation.

FIG. 10 is a sequence diagram showing an example of a friend information mutual utilization operation performed between communication terminal 20 and friend candidate management server 10. In the following description of the present operation, a case is assumed where a user, whose user identification information for management is "M001" and "A1," of communication terminal 20 executes application P1. Also, as contents of user information DB 121, friend candidate DB 122, and friend list L1, examples shown in FIG. 3A, FIG. 3B, and FIG. 5A are referred to.

If the user of communication terminal 20 provides an instruction to execute application P1 (Sa1), sending unit 212 sends friend list L1 to friend candidate management server 10 (Sa2). When doing so, sending unit 212 sends in addition to friend list L1, user identification information for management of the user and identification information of application P1 to friend candidate management server 10.

Receiving unit 111 of friend candidate management server 10 receives the information including friend list L1 sent by communication terminal 20. When the information is received by receiving unit 111, registration unit 112 stores sets of friend information and establishing-method information registered in the received friend list L1 in friend candidate DB 122 in association with the user identification information of the user and the identification information of application P1 (Sa3). When doing so, registration unit 112 omits storing friend information registered in friend list L1, which is already associated with the user identification information for management of the user in friend candidate DB 122. In the present operation example, registration unit 112 stores in friend candidate DB 122 as friend candidate information, user identification information "P104" and "D2" in association with user identification information for management "M001" and "A1," identification information "P1" of application P1, and establishing-method information "non-face-to-face."

After the friend candidate information is stored, registration unit 112 associates with the friend candidate information newly stored in friend candidate DB 122, friend candidate information for another application (Sa4). Specifically, registration unit 112 extracts from user information DB 121 user identification information for another application corresponding to the newly-stored friend candidate information, and stores the extracted user identification information in friend candidate DB 122 in association with the newly-stored friend candidate information. In the present operation example, registration unit 112 extracts user identification information "P204" and "D3" for application P2, user identification information "S004" and "D4" for application P3, and user identification information "G004" and "D5" for applications P4 and P5, and stores the extracted items of information in friend candidate DB 122 in association with user identification information "P104" and "D2." FIG. 11A shows an example of friend candidate DB 122 that has been updated as a result of step Sa5.

After the association of friend candidate information is completed, registration unit 112 identifies the difference between the friend information registered in friend list L1 and friend information for application P1 of the user registered in friend candidate DB 122 (Sa5). In other words, registration unit 112 identifies friend information for application P1 of the user registered in friend candidate DB 122, which is not registered in friend list L1. The identified friend information will be presented to the user as friend candidate information. In the present operation example, registration unit 112 identifies user identification information "P103" and "C2" as friend candidate information to be presented to the user.

After the friend candidate information is identified, sending unit 113 sends the friend candidate information identified at step Sa5 to communication terminal 20, together with identification information of an application and establishing-method information, which correspond to the identified friend candidate information (Sa6).

Receiving unit 213 of communication terminal 20 receives the information including the friend candidate information sent by friend candidate management server 10. When the information is received by receiving unit 213, presenting unit 214 causes touch screen 24 to display the received friend candidate information as candidate(s) for registration in friend list L1 (Sa7). When doing so, presenting unit 214 also causes touch screen 24 to display the identification information of an application and establishing-method information, which have been received together with the friend candidate information. In the present operation example, presenting unit 214 causes touch screen 24 to display a message that recommends another user "C2" as a friend candidate, together with a message stating that the user and the other user "C2" have become friends using application P2 through non-face-to-face authentication.

After the friend candidate information is displayed, if the friend candidate information is selected by the user as a subject for registration in friend list L1, sending unit 212 sends a friend request to the other user "C2" identified by the friend candidate information. If the sent friend request is approved by the other user "C2," registration unit 211 registers the friend candidate information in friend list L1.

The foregoing is a description of an example of a friend information mutual utilization operation performed between communication terminal 20 and friend candidate management server 10.

In the operation example described above, the user of communication terminal 20, while application P1 is running, is presented with user identification information for application P1 corresponding to friend information for application P2 as a friend candidate, and the user identification information is registered. Namely, in the above operation example, friend information is mutually utilized between different applications in an information-processing device.

1-2-2. Friend Information Mutual Utilization Operation of Gaming Device 30

An example of a friend information mutual utilization operation performed between gaming device 30 and friend candidate management server 10 will be described by referring to FIG. 10 again. In the following description of the present operation, a case is assumed where a user, whose user identification information for management is "M001" and "A1," of gaming device 30 executes application P4. Also, as contents of user information DB 121, friend candidate DB 122, and friend list L3, examples shown in FIG. 3A, FIG. 11A, and FIG. 7 are referred to.

If the user of gaming device 30 provides an instruction to execute application P4 (Sa1), sending unit 312 sends friend list L3 to friend candidate management server 10 (Sa2). When doing so, sending unit 312 sends in addition to friend list L3, user identification information for management of the user and identification information of application P4 to friend candidate management server 10.

Receiving unit 111 of friend candidate management server 10 receives the information including friend list L3 sent by gaming device 30. When the information is received by receiving unit 111, registration unit 112 stores sets of friend information and establishing-method information registered in the received friend list L3 in friend candidate DB 122 in association with the user identification information for management of the user and the identification information of application P4 (Sa3). When doing so, registration unit 112 omits storing friend information registered in friend list L3, which is already associated with the user identification information for management of the user in friend candidate DB 122. In the present operation example, registration unit 112 stores in friend candidate DB 122 as friend candidate information, user identification information "G005" and "E5" in association with user identification information for management "M001" and "A1," identification information "P4" of application P4, and establishing-method information "non-face-to-face."

After the friend candidate information is stored, registration unit 112 associates with the friend candidate information newly stored in friend candidate DB 122, friend candidate information for another application (Sa4). Specifically, registration unit 112 extracts from user information DB 121 user identification information for another application corresponding to the newly-stored friend candidate information, and stores the extracted user identification information in friend candidate DB 122 in association with the newly-stored friend candidate information. In the present operation example, registration unit 112 extracts user identification information "P105" and "E2" for application P1, user identification information "P205" and "E3" for application P2, and user identification information "S005" and "E4" for application P3, and stores the extracted items of information in friend candidate DB 122 in association with user identification information "G005" and "E5." FIG. 11B shows an example of friend candidate DB 122 that has been updated as a result of step Sa5.

After the association of friend candidate information is completed, registration unit 112 identifies the difference between the friend information registered in friend list L3 and friend information for application P3 of the user registered in friend candidate DB 122 (Sa5). In other words, registration unit 112 identifies friend information for application P3 of the user registered in friend candidate DB 122, which is not registered in friend list L3. The identified friend information will be presented to the user as friend candidate information. In the present operation example, registration unit 112 identifies user identification information "G004" and "D5" as friend candidate information to be presented to the user.

After the friend candidate information is identified, sending unit 113 sends the friend candidate information identified at step Sa5 to gaming device 30, together with identification information of an application and establishing-method information, which correspond to the identified friend candidate information (Sa6).

Receiving unit 313 of gaming device 30 receives the information including the friend candidate information sent by friend candidate management server 10. When the information is received by receiving unit 313, presenting unit 314 causes display unit 34 to display the received friend candidate information as candidate(s) for registration in friend list L3 (Sa7). When doing so, presenting unit 314 also causes display unit 34 to display the identification information of an application and establishing-method information, which are received together with the friend candidate information. In the present operation example, presenting unit 314 causes display unit 34 to display a message that recommends another user "D5" as a friend candidate, together with a message stating that the user and the other user "D5" have become friends using application P1 through non-face-to-face authentication.

After the friend candidate information is displayed, if the friend candidate information is selected by the user as a subject for registration in friend list L3, sending unit 312 sends a friend request to the other user "D5" identified by the friend candidate information. If the sent friend request is approved by the other user "D5," registration unit 311 registers the friend candidate information in friend list L3.

The foregoing is a description of an example of a friend information mutual utilization operation performed between gaming device 30 and friend candidate management server 10.

In the operation example described above, the user of gaming device 30, while application P4 is running, is presented with user identification information for application P4 corresponding to friend information for application P1 registered in communication terminal 20, as a friend candidate, and the user identification information is registered. Namely, in the above operation example, friend information is mutually utilized between different applications and between different information-processing devices. Since communication terminal 20 and gaming device 30 include different types of platforms, as described above, it can be said that friend information is mutually utilized between different types of platforms.

1-2-3. Friend Information Mutual Utilization Operation of SNS Server 40

Figure 12:
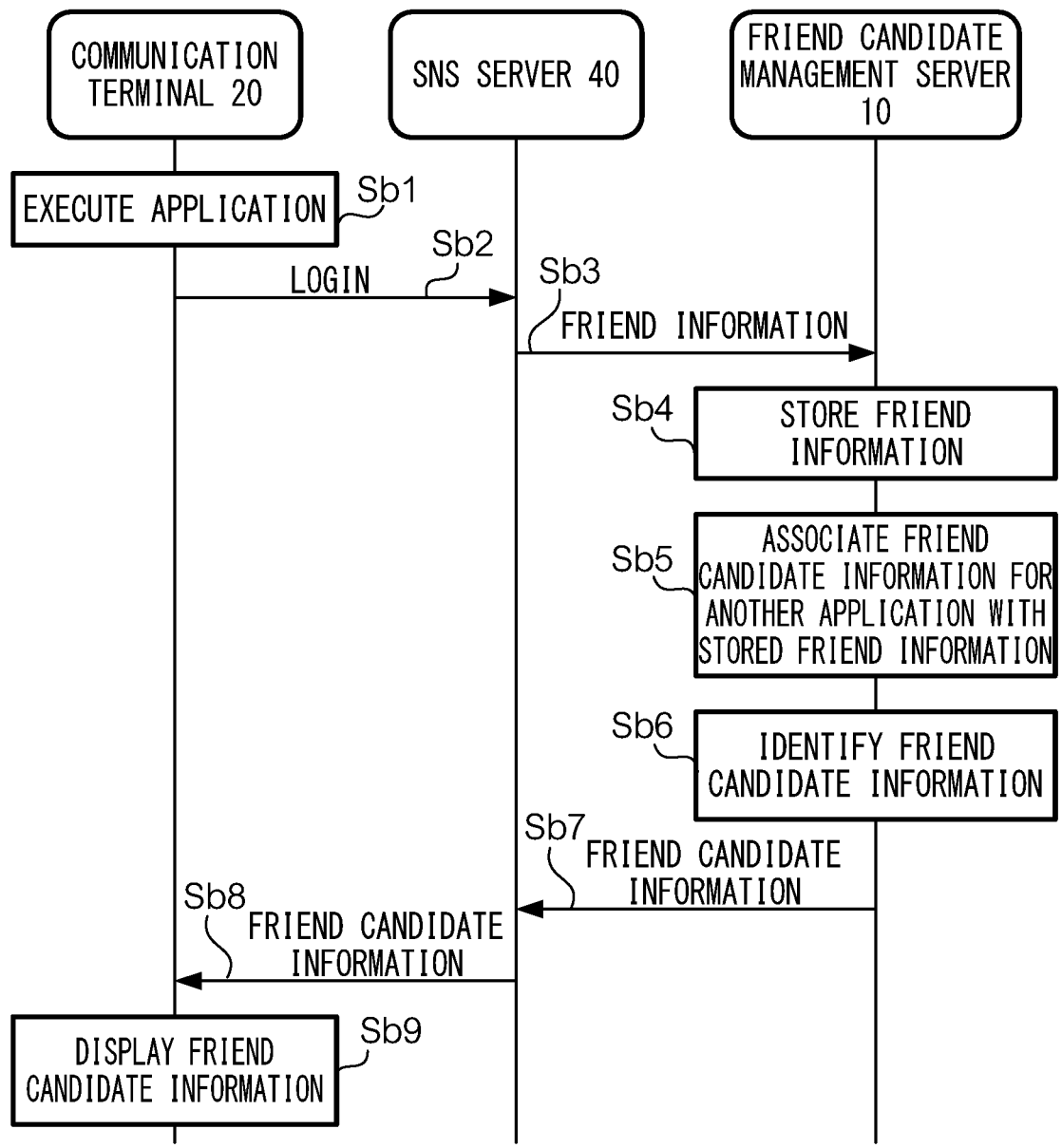
FIG. 12 is a sequence diagram showing an example of a friend information mutual utilization operation.

An example of a friend information mutual utilization operation performed between SNS server 40 and friend candidate management server 10 will be described. FIG. 12 is a sequence diagram showing an example of the friend information mutual utilization operation. In the following description of the present operation, a case is assumed where a user, whose user identification information for management is "M001" and "A1," of communication terminal 20 executes application P3 to access SNS server 40. Also, as contents of user information DB 121, friend candidate DB 122, and friend information DB 421, examples shown in FIG. 3A, FIG. 11B, and FIG. 9 are referred to.

If the user of communication terminal 20 provides an instruction to execute application P3 (Sb1) to log into SNS server 40 (Sb2), sending unit 412 of the server sends sets of friend information and establishing-method information of the user to friend candidate management server 10 (Sb3). When doing so, sending unit 412 sends, in addition to the sets of information, user identification information for management of the user and identification information of application P3 to friend candidate management server 10.

Receiving unit 111 of friend candidate management server 10 receives the information including the friend information sent by SNS server 40. When the information is received by receiving unit 111, registration unit 112 stores the received sets of friend information and establishing-method information in friend candidate DB 122 in association with the user identification information for management of the user and the identification information of application P3 (Sb4). When doing so, registration unit 112 omits storing received friend information that is already associated with the user identification information for management of the user in friend candidate DB 122. In the present operation example, registration unit 112 omits storing friend candidate information.

After the friend candidate information is stored, registration unit 112 associates with the friend candidate information newly stored in friend candidate DB 122, friend candidate information for another application (Sb5). Specifically, registration unit 112 extracts from user information DB 121 user identification information for another application corresponding to the newly-stored friend candidate information, and stores the extracted user identification information in friend candidate DB 122 in association with the newly-stored friend candidate information. In the present operation example, registration unit 112 omits associating friend candidate information for another application.

After the association of friend candidate information is completed, registration unit 112 identifies the difference between the received friend information and friend information for application P3 of the user registered in friend candidate DB 122 (Sb6). In other words, registration unit 112 identifies friend information for application P3 of the user registered in friend candidate DB 122, which has not been received. The identified friend information will be presented to the user as friend candidate information. In the present operation example, registration unit 112 identifies user identification information "S005" and "E4" as friend candidate information to be presented to the user.

After the friend candidate information is identified, sending unit 113 sends the friend candidate information identified at step Sb6 to SNS server 40, together with identification information of an application and establishing-method information, which correspond to the identified friend candidate information (Sb7).

Receiving unit 413 of SNS server 40 receives the information including the friend candidate information sent by friend candidate management server 10. When the information is received by receiving unit 413, sending unit 412 sends the information to communication terminal 20 (Sb8).

Receiving unit 213 of communication terminal 20 receives the information including the friend candidate information sent by SNS server 40. When the information is received by receiving unit 213, presenting unit 214 causes touch screen 24 to display the received friend candidate information as candidate(s) for registration in friend information DB 421 of SNS server 40 (Sb9). When doing so, presenting unit 214 also causes touch screen 24 to display the identification information of an application and establishing-method information, which have been received together with the friend candidate information. In the present operation example, presenting unit 214 causes touch screen 24 to display a message that recommends another user "E4" as a friend candidate, together with a message stating that the user and the other user "E4" have become friends using application P4 through non-face-to-face authentication.

After the friend candidate information is displayed, if the friend candidate information is selected by the user as a subject for registration in friend information DB 421, sending unit 212 sends a friend request to the other user "E4" identified by the friend candidate information, via SNS server 40. If the sent friend request is approved by the other user "E4," the friend candidate information is registered in friend information DB 421.

The foregoing is a description of an example of a friend information mutual utilization operation performed between SNS server 40 and friend candidate management server 10.

In the operation example described above, the user of communication terminal 20, while application P3 is running, is presented with user identification information for application P3 corresponding to friend information for application P4 registered in gaming device 30, as a friend candidate, and the user identification information is registered. Namely, in the above operation example, friend information is mutually utilized between different applications and between different information-processing devices. Since communication terminal 20 and gaming device 30 include different types of platforms, as described above, it can be said that friend information is mutually utilized between different types of platforms.

2. Modifications

The above embodiment may be modified as described below. Two or more of the following modifications may be combined with each other.

2-1. Modification 1

In information-processing system 1 according to the above embodiment, where friend information is mutually utilized between devices or applications, relationship information other than friend information may be mutually utilized. For example, information-processing system 1 may enable mutual utilization of favorite information (in other words, follow information). Adding someone as a favorite is a relationship established based on an agreement of only one of users. Favorite information is identification information of another user. Registering favorite information in an information-processing device leads to establishment of a relationship of favorite. When a relationship of favorite is established, for example, a user is able to automatically acquire a message posted by another user.

2-2. Modification 2

An information-processing device according to the above embodiment, such as communication terminal 20, gaming device 30, or SNS server 40, sends friend information to friend candidate management server 10 while an application is running; however, the information-processing device may send friend information at a determined timing other than when an application is running. For example, the information-processing device may send friend information upon detecting an update of the friend information in the device. Alternatively, the information-processing device may send friend information at predetermined time intervals. Alternatively, the information-processing device may send friend information upon detecting a user's manual instruction.

In the above embodiment, the information-processing device sends friend information to friend candidate management server 10 based on a user's comprehensive agreement; however, the information-processing device may send friend information based on a user's particular agreement. In other words, a user's agreement may be obtained each time friend information is sent.

In the above embodiment, the information-processing device may determine whether to send friend information to friend candidate management server 10, based on a user's attribute. Specifically, the information-processing device may determine whether to send friend information, based on a user's nationality, race, language, gender, or age.

In the above embodiment, the information-processing device may narrow down friend information to be sent to friend candidate management server 10. For example, the information-processing device may narrow down friend information to be sent, so that there will be no overlaps with friend candidate information already registered in friend candidate DB 122 in association with a user of the device. Alternatively, the information-processing device may narrow down friend information to be sent, based on friend establishing-methods. Specifically, the information-processing device may send only friend information on friendships established through face-to-face authentication. Alternatively, the information-processing device may narrow down friend information to be sent, based on friend establishing times. Specifically, the information-processing device may send only friend information on friendships established within a predetermined time period from a present time. Alternatively, the information-processing device may narrow down friend information to be sent, based on histories of activities performed together with a friend. Specifically, the information-processing device may send only friend information of friends, the number or frequency of communications, or battle or collaborative game plays with which exceeds a predetermined value. Alternatively, in a case where there are plural types of relationships with another user, the information-processing device may narrow down relationship information to be sent, based on types of relationships with another user. Specifically, the information-processing device may send only friend information among friend information and favorite information.

2-3. Modification 3

Friend candidate management server 10 according to the above embodiment sends friend candidate information to an information-processing device while an application is running; however, the server may send friend candidate information at a determined timing other than when an application is running. For example, friend candidate management server 10 may send friend candidate information upon detecting an update of friend candidate DB 122. Alternatively, friend candidate management server 10 may send friend candidate information at predetermined time intervals.

In the above embodiment, friend candidate management server 10 sends friend candidate information to an information-processing device based on a user's comprehensive agreement; however, the server may send friend candidate information based on a user's particular agreement. In other words, friend candidate management server 10 may send friend candidate information upon detecting a manual instruction from a user of an information-processing device. Alternatively, friend candidate management server 10 may send friend candidate information to an information-processing device, without obtaining an agreement of a user of the device.

In the above embodiment, friend candidate management server 10 may determine whether to send friend candidate information to an information-processing device, based on an attribute of a user of the device. Specifically, friend candidate management server 10 may determine whether to send friend candidate information, based on a user's nationality, race, language, gender, or age.

In the above embodiment, the information-processing device may further narrow down friend candidate information to be sent to an information-processing device. For example, friend candidate management server 10 may narrow down friend candidate information to be sent, based on friend establishing-methods. Specifically, friend candidate management server 10 may send only friend candidate information on friendships established through face-to-face authentication. Alternatively, friend candidate management server 10 may narrow down friend candidate information to be sent, based on friend establishing times. Specifically, friend candidate management server 10 may send only friend candidate information on friendships established within a predetermined time period from a present time. Alternatively, friend candidate management server 10 may narrow down friend candidate information to be sent, based on histories of activities performed together with a friend. Specifically, friend candidate management server 10 may send only friend candidate information of friends, the number or frequency of communications, or battle or collaborative game plays with which exceeds a predetermined value. Alternatively, friend candidate management server 10 may narrow down friend candidate information to be sent, based on attributes of friends such as nationality, race, language, gender, or age. Alternatively, friend candidate management server 10 may narrow down friend candidate information to be sent, based on types of programs that have been running when a friendship has been established, or based on types of platforms of an information-processing device in which friend information has been registered. Alternatively, in a case where there are plural types of relationships with another user, friend candidate management server 10 may narrow down relationship candidate information to be sent, based on types of relationships with another user. Specifically, friend candidate management server 10 may send only friend candidate information among friend candidate information and favorite candidate information. Alternatively, friend candidate management server 10 may narrow down friend candidate information to be sent, to avoid resending friend candidate information to a user that has been presented to the user and has not been selected for sending a friend request. To prevent duplicate presentation of friend information, friend candidate management server 10 may store in friend candidate DB 122 in association with friend information, information indicative of whether the friend information has been presented to a user (in other words, whether the friend information has been sent to an information-processing device).

2-4. Modification 4

An information-processing device according to the above embodiment may register friend candidate information sent from friend candidate management server 10, as friend information of a user, without waiting for an instruction from the user. For example, the information-processing device may register friend candidate information, a friend establishing-method of which satisfies a predetermined condition, as friend information, without waiting for a user's instruction. The predetermined condition is, for example, that a friend establishing-method is face-to-face authentication, since a friend made through face-to-face authentication is more likely to be a friend in the real world than a friend made through non-face-to-face authentication.

2-5. Modification 5

In information-processing system 1 according to the above embodiment, user identification information is different for each application; however, user identification information common to all applications may be used. For example, user identification information for management may be used for all applications. When user identification information common to all applications is used, a process of associating friend candidate information for another application (specifically, step Sa5 shown in FIG. 10 and step Sb6 shown in FIG. 12) may be omitted in the friend information mutual utilization operation according to the above embodiment.

2-6. Modification 6

A program stored in storage unit 12 of friend candidate management server 10 may be provided to the server via a computer-readable non-transitory storage medium, which includes a magnetic storage medium such as a magnetic tape or a magnetic disk, an optical storage medium such as an optical disk, a magneto-optical storage medium, or a semiconductor memory. Alternatively, the program may be provided to friend candidate management server 10 via a network such as the Internet.

2-7. Modification 7

In the friend information mutual utilization operation according to the above embodiment (see FIG. 10 or 12), registration unit 112 of friend candidate management server 10 that has received friend information from an information-processing device, which information is already registered in friend candidate DB 122, may store only establishing-method information and identification information of an application, which correspond to the friend information, in friend candidate DB 122 in association with user identification information for management. In other words, registration unit 112 may store in friend candidate DB 122 for each item of friend information, plural sets of identification information of an application that is running when a friendship is established, and establishing-method information indicative of a method by which the friendship is established. For example, in the above friend information mutual utilization operation of communication terminal 20 (see FIG. 10), registration unit 112, in a case where friend list L1 received from communication terminal 20 includes user identification information "P103" and "C2," and establishing-method information "face-to-face," may store only establishing-method information "face-to-face" and identification information of application P1 in friend candidate DB 122 in association with user identification information for management "M001" and user identification information "P103" and "C2," already stored in the database.

Sending unit 113 of friend candidate management server 10, when sending to an information-processing device, friend candidate information associated with plural sets of identification information of an application and establishing-method information, may send the plural sets of information to the device, together with the friend candidate information. A presenting unit of the information-processing device that has received the information sent by friend candidate management server 10, causes a display unit to display the friend candidate information and the plural sets of identification information of an application and establishing-method information. For example, in the above friend information mutual utilization operation of communication terminal 20 (see FIG. 10), presenting unit 214 of communication terminal 20 that has received friend candidate information "P105" and "E2," together with a set of identification information of application P2 and establishing-method information "non-face-to-face" and a set of identification information of application P3 and establishing-method information "non-face-to-face," causes touch screen 24 to display a message that recommends another user "E2" as a friend candidate, together with a message stating that a user and the other user "E2" have become friends using application P2 through non-face-to-face authentication, and that the user and the other user "E2" have become friends using application P3 through non-face-to-face authentication.

2-8. Modification 8

In information-processing system 1 according to the above embodiment, communication terminal 20 stores friend information for application P1 and friend information for application P2; therefore, in the friend information mutual utilization operation shown in FIG. 10, communication terminal 20 provides friend information to friend candidate management server 10. However, if an application server, in addition to or instead of, communication terminal 20, stores friend information, the application server may provide friend information to friend candidate management server 10. Below, such an embodiment will be described.

Figures 13, 14:
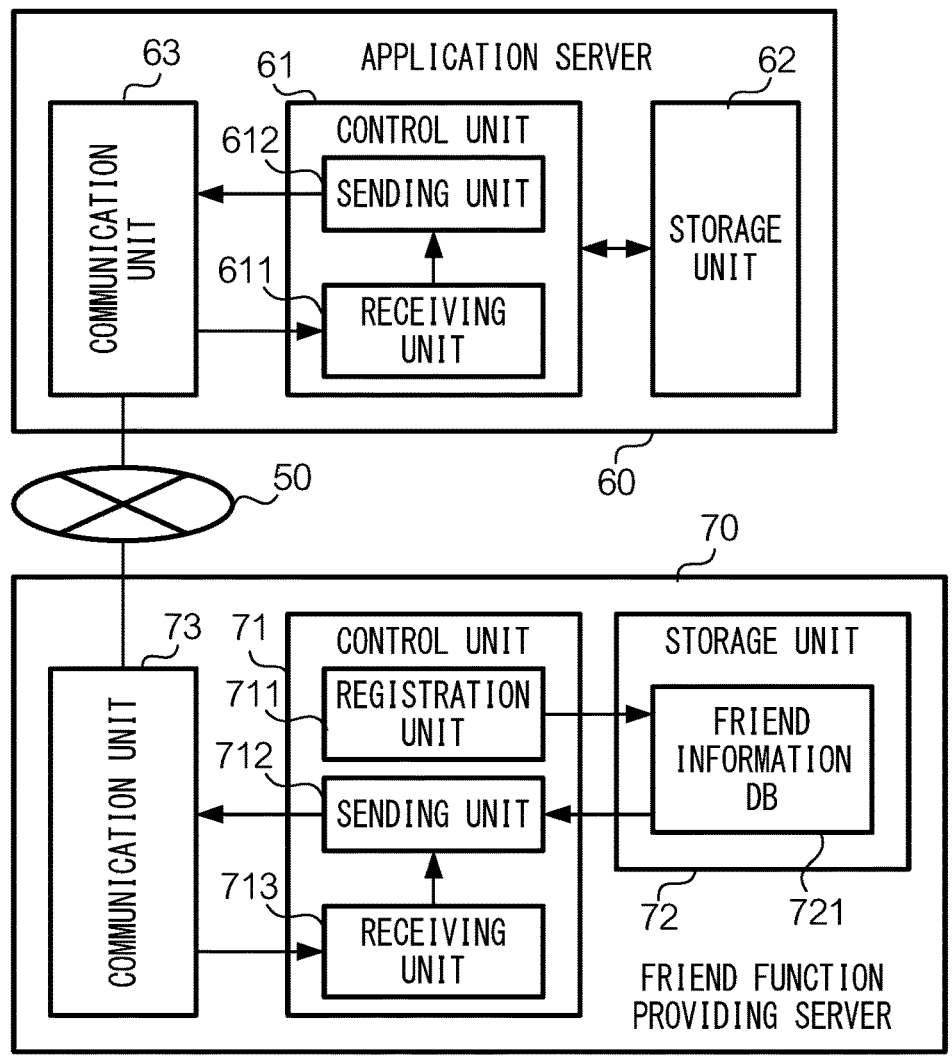
FIG. 13 is a diagram showing an example each of configurations of application server 60 and friend function providing server 70.
FIG. 14 is a diagram showing an example of friend information DB 721.

FIG. 13 is a diagram showing an example each of configurations of application server 60 and friend function providing server 70, which servers cooperate with each other to exchange friend information with friend candidate management server 10 to mutually utilize friend information between devices.

Application server 60 is an information-processing device that provides a user of communication terminal 20 with an execution environment for application P1 via network 50. Application P1 is, for example, a game application. Application server 60 includes a platform different from that of gaming device 30 or SNS server 40. Specifically, application server 60 includes an OS and a hardware environment, types of which are different from those of gaming device 30 or SNS server 40. Application server 60 includes control unit 61, storage unit 62, and communication unit 63.

Control unit 61 includes a computer processor such as a CPU and a memory, and executes a program stored in storage unit 62. Functions provided by control unit 61 will be described later. Storage unit 62 is a storage device such as a hard disk, and stores programs for execution by control unit 61. Communication unit 63 is a communication interface for communicating with devices such as friend candidate management server 10 via network 50.

Control unit 61, by executing a program stored in storage unit 62, provides receiving unit 611 and sending unit 612.

Receiving unit 611, for presenting to a user by executing a program, receives from friend candidate management server 10, identification information of another user stored in storage unit 12 (specifically, friend candidate DB 122) of the server. When doing so, receiving unit 611 receives identification information of another user based on a comprehensive agreement of a user of communication terminal 20 each time the program is started by the user. Receiving unit 611 also receives, in addition to identification information of another user, identification information of a program and establishing-method information indicative of a method in which a friendship has been established. Identification information of another user is user identification information for the started program. Receiving unit 611 receives identification information of another user, which information has not yet been registered in friend function providing server 70 (specifically, friend information DB 721) in association with a user of an information-processing device through execution of the program.

Sending unit 612 sends information received by receiving unit 611, which includes identification information of another user, identification information of a program, and establishing-method information, to communication terminal 20.

Friend function providing server 70 is an information-processing device that manages friend information for application P1 for application server 60. Friend function providing server 70 may include a function of issuing user identification information for application P1 to a user who has started the application for the first time, a function of managing virtual currency used when application P1 is running, or a function of sending a push notification to communication terminal 20 when application P1 is not running. Friend function providing server 70 includes control unit 71, storage unit 72, and communication unit 73.

Control unit 71 includes a computer processor such as a CPU and a memory, and executes a program stored in storage unit 72. Functions provided by control unit 71 will be described later. Storage unit 72 is a storage device such as a hard disk, and stores programs for execution by control unit 71, and friend information DB 721.

FIG. 14 is a diagram showing an example of friend information DB 721, which is a database for managing friend information registered by executing application P1. Friend information DB 721 stores in association with user identification information for management, friend information for application P1 and establishing-method information indicative of a method by which a friendship has been established. Friend information is user identification information of another user.

Communication unit 73 is a communication interface for communicating with devices such as friend candidate management server 10 via network 50.

Control unit 71, by executing a program stored in storage unit 72, provides registration unit 711, sending unit 712, and receiving unit 713.

Registration unit 711 registers identification information of another user in friend information DB 721 as friend information of a user of communication terminal 20. When doing so, registration unit 711 performs the registration based on a mutual agreement between the other user and a user of communication terminal 20. Specifically, registration unit 711 performs the registration after one of the users approves a request from the other user. When registering friend information, registration unit 711 registers it in association with establishing-method information indicative of a method by which a friendship has been established.

Sending unit 712 sends to friend candidate management server 10, identification information of another user registered by executing a program. When doing so, sending unit 712 sends identification information of another user based on a comprehensive agreement of a user of communication terminal 20 each time the program is started by the user. Specifically, sending unit 712 sends friend information of a target user stored in friend information DB 721 to friend candidate management server 10.

Receiving unit 713 receives from application server 60, identification information of another user to be registered in friend information DB 721 as friend information.

Figure 15:
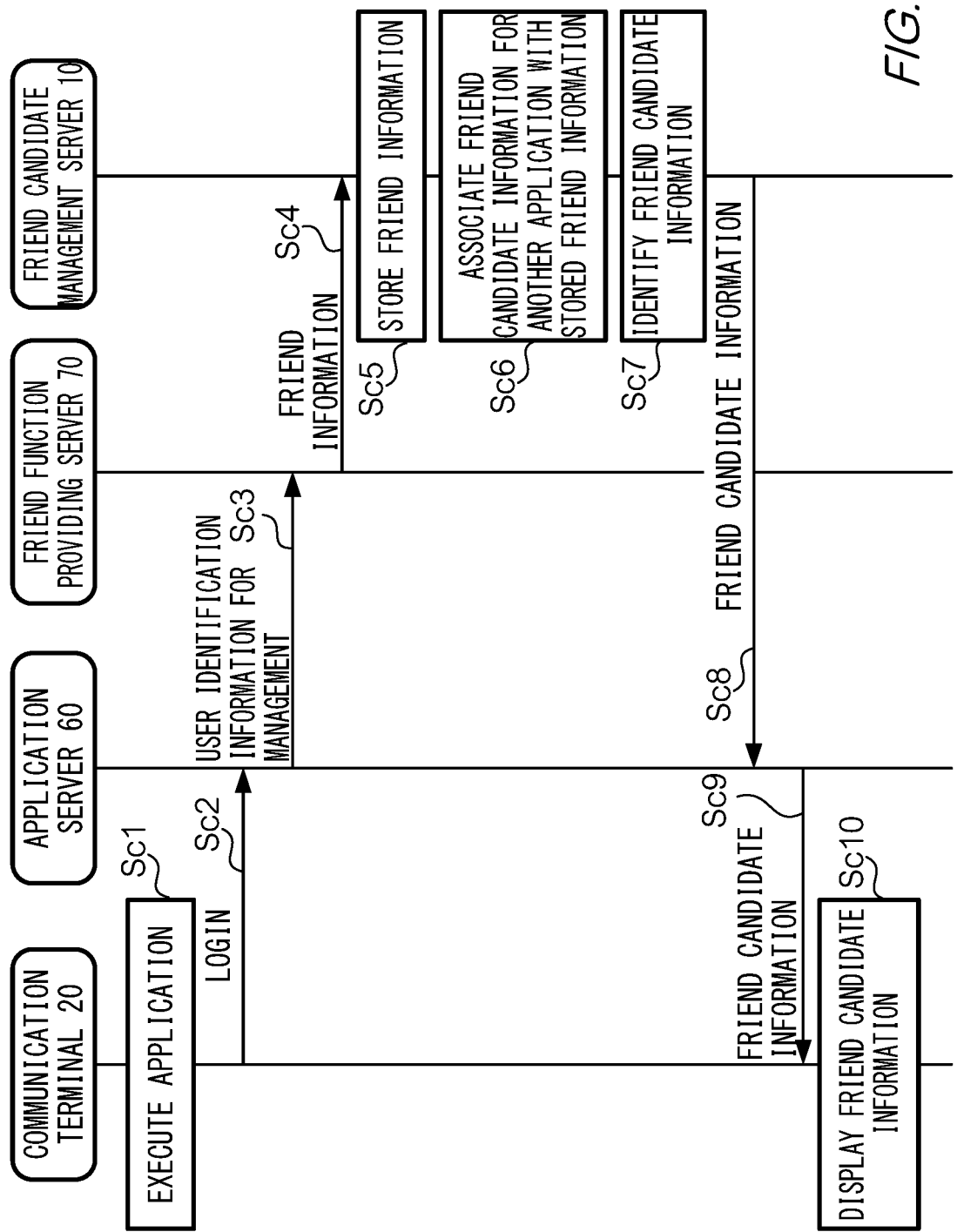
FIG. 15 is a sequence diagram showing an example of a friend information mutual utilization operation.

Now, an example of a friend information mutual utilization operation performed among application server 60, friend function providing server 70, and friend candidate management server 10 will be described. FIG. 15 is a sequence diagram showing an example of the friend information mutual utilization operation. In the following description of the present operation, a case is assumed where a user, whose user identification information for management is "M001" and "A1," of communication terminal 20 executes application P1 to access application server 60. Also, as contents of user information DB 121, friend candidate DB 122, and friend information DB 721, examples shown in FIG. 3A, FIG. 3B, and FIG. 14 are referred to.

If the user of communication terminal 20 provides an instruction to execute application P1 (Sc1) to log into application server 60 (Sc2), sending unit 612 of the server sends user identification information for management of the user to friend function providing server 70 (Sc3).

Receiving unit 713 of friend function providing server 70 receives the user identification information for management sent by application server 60. When the user identification information for management is received by receiving unit 713, sending unit 712 sends to friend candidate management server 10, sets of friend information and establishing-method information of the user identified by the user identification information for management (Sc4). When doing so, sending unit 712 sends, in addition to the sets of information, user identification information for management of the user and identification information of application P1 to friend candidate management server 10.

Receiving unit 111 of friend candidate management server 10 receives the information including the friend information sent by application server 60. When the information is received by receiving unit 111, registration unit 112 stores the received sets of friend information and establishing-method information in friend candidate DB 122 in association with the user identification information for management of the user and the identification information of application P1 (Sc5). When doing so, registration unit 112 omits storing friend information received, which information is already associated with the user identification information for management of the user in friend candidate DB 122. In the present operation example, registration unit 112 stores in friend candidate DB 122 as friend candidate information, user identification information "P104" and "D2" in association with user identification information for management "M001" and "A1," identification information "P1" of application P1, and establishing-method information "non-face-to-face."

After the friend candidate information is stored, registration unit 112 associates with the friend candidate information newly stored in friend candidate DB 122, friend candidate information for another application (Sc6). Specifically, registration unit 112 extracts from user information DB 121 user identification information for another application corresponding to the newly-stored friend candidate information, and stores the extracted user identification information in friend candidate DB 122 in association with the newly-stored friend candidate information. In the present operation example, registration unit 112 extracts user identification information "P204" and "D3" for application P2, user identification information "S004" and "D4" for application P3, and user identification information "G004" and "D5" for applications P4 and P5, and stores the extracted items of information in friend candidate DB 122 in association with user identification information "P104" and "D2."

After the association of friend candidate information is completed, registration unit 112 identifies the difference between the received friend information and friend information for application P1 of the user registered in friend candidate DB 122 (Sc7). In other words, registration unit 112 identifies friend information for application P1 of the user registered in friend candidate DB 122, which has not been received. The identified friend information will be presented to the user as friend candidate information. In the present operation example, registration unit 112 identifies user identification information "P103" and "C2" as friend candidate information to be presented to the user.

After the friend candidate information is identified, sending unit 113 sends the identified friend candidate information to application server 60, together with identification information of an application and establishing-method information, which correspond to the identified friend candidate information (Sc8).

Receiving unit 611 of application server 60 receives the information including the friend candidate information sent by friend candidate management server 10. When the information is received by receiving unit 611, sending unit 612 sends the information to communication terminal 20 (Sc9).

Receiving unit 213 of communication terminal 20 receives the information including the friend candidate information sent by application server 60. When the information is received by receiving unit 213, presenting unit 214 causes touch screen 24 to display the received friend candidate information as candidate(s) for registration in friend information DB 721 of friend function providing server 70 (Sc10). When doing so, presenting unit 214 also causes touch screen 24 to display the identification information of an application and establishing-method information, which have been received together with the friend candidate information. In the present operation example, presenting unit 214 causes touch screen 24 to display a message that recommends another user "C2" as a friend candidate, together with a message stating that the user and the other user "C2" have become friends using application P2 through non-face-to-face authentication.

After the friend candidate information is displayed, if the friend candidate information is selected by the user as a subject for registration in friend information DB 721, sending unit 212 sends a friend request to the other user "C2" identified by the friend candidate information, via application server 60. If the sent friend request is approved by the other user "C2," application server 60 sends the friend candidate information to friend function providing server 70 to be registered in friend information DB 721.

The foregoing is a description of an example of a friend information mutual utilization operation performed among application server 60, friend function providing server 70, and friend candidate management server 10.

In the operation example described above, the user of communication terminal 20, while application P1 is running, is presented with user identification information for application P1 corresponding to friend information for application P2, as a friend candidate, and the user identification information is registered. Namely, in the above operation example, friend information is mutually utilized between different applications in an information-processing device.

It is of note that in the above operation example, where application server 60 provides friend candidate information to communication terminal 20, friend function providing server 70, instead of application server 60, may provide friend candidate information to communication terminal 20. Alternatively, friend candidate management server 10 may provide friend candidate information directly to communication terminal 20, without involvement of either application server 60 or friend function providing server 70.

Modifications 2 to 4 described above may be applied to application server 60 or friend function providing server 70.

2-9. Modification 9

Application server 60 according to modification 8 described above may acquire friend information stored in SNS server 40 to present friend candidate information to a user of communication terminal 20 based on the friend information. In other words, application server 60, instead of friend candidate management server 10, may enable mutual utilization of friend information between the application server and SNS server 40. Below, such an embodiment will be described.

Storage unit 72 of friend function providing server 70 according to the present modification stores in addition to friend information DB 721, user information DB 722 and friend candidate DB 723.

FIG. 16A is a diagram showing an example of user information DB 722, which is a database for managing different types of identification information for each user of application P1. User information DB 722 stores, in association with user identification information for management, user identification information for application P1 and user identification information for application P3. User identification information for each application, together with user identification information for management, is sent to friend function providing server 70 to be registered via application server 60, for example, when application P1 is running in communication terminal 20.

FIG. 16B is a diagram showing an example of friend candidate DB 723, which is a database for storing friend information received from communication terminal 20. Friend information stored in friend candidate DB 723 is sent to communication terminal 20 as candidates of friend information. Friend candidate DB 723 stores, in association with user identification information for management, items of friend information for an application and information relevant to the friend information. Information relevant to friend information is, specifically, an application name, which is identification information of an application which has been running when a friendship has been established, and establishing-method information indicative of a method by which the friendship has been established. It is of note that an application name is an example of identification information of an application; accordingly, an application ID may be used instead.

Figure 17:
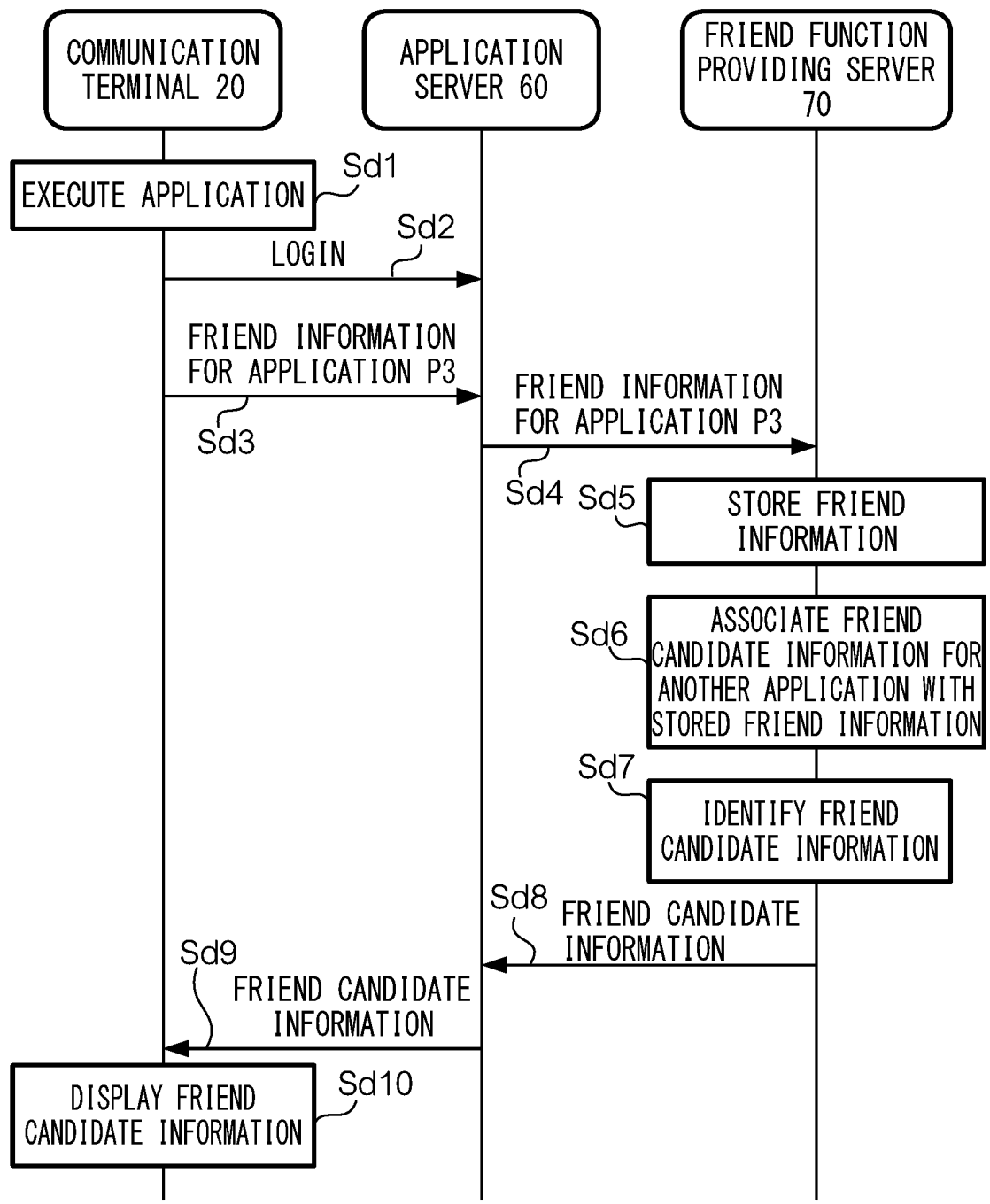
FIG. 17 is a sequence diagram showing an example of a friend information mutual utilization operation.

Now, an example of a friend information mutual utilization operation performed among application server 60, friend function providing server 70, and SNS server 40 will be described. FIG. 17 is a sequence diagram showing an example of the friend information mutual utilization operation. In the following description of the present operation, a case is assumed where a user, whose user identification information for management is "M001" and "A1," of communication terminal 20 executes application P1 to access application server 60, and the user has already acquired from friend information DB 421 of SNS server 40, friend information for application P3 of the user and corresponding establishing-method information. Also, as contents of friend information DB 421, friend information DB 721, user information DB 722, and friend candidate DB 723, examples shown in FIG. 9, FIG. 14, and FIGS. 16A and 16B are referred to.

The user of communication terminal 20 provides an instruction to execute application P1 (Sd1) to log into application server 60 (Sd2). After logging into the server, communication terminal 20, in accordance with an instruction from the user, sends sets of friend information for application P3 of the user and establishing-method information to application server 60, together with user identification information for management of the user and identification information of application P3 (Sd3).

Receiving unit 611 of application server 60 receives the information including the friend information for application P3 sent by communication terminal 20. When the information is received by receiving unit 611, sending unit 612 sends the received information to friend function providing server 70 (Sd4).

Receiving unit 713 of friend function providing server 70 receives the information including the friend information for application P3 sent by application server 60. When the information is received by receiving unit 713, registration unit 711 stores the received sets of friend information and establishing-method information in friend candidate DB 723 in association with the user identification information for management of the user and the identification information of application P3 (Sd5). When doing so, registration unit 711 omits storing friend information received, which is already associated with the user identification information for management of the user in friend candidate DB 723. In the present operation example, registration unit 711 stores in friend candidate DB 723 as friend candidate information, user identification information "S004" and "D4" in association with user identification information for management "M001" and "A1," identification information "P3" of application P3, and establishing-method information "non-face-to-face."

After the friend candidate information is stored, registration unit 711 associates with the friend candidate information newly stored in friend candidate DB 723, friend candidate information for application P1 (Sd6). Specifically, registration unit 711 extracts from user information DB 722 user identification information for application P1 corresponding to the newly-stored friend candidate information, and stores the extracted user identification information in friend candidate DB 723 in association with the newly-stored friend candidate information. In the present operation example, registration unit 711 extracts user identification information "P104" and "D2" for application P1, and stores the extracted information in friend candidate DB 723 in association with user identification information for application P3 "S004" and "D4."

After the association of friend candidate information is completed, registration unit 711 identifies the difference between friend information registered in friend information DB 721 in association with the user and friend information for application P1 of the user registered in friend candidate DB 723 (Sd7). In other words, registration unit 711 identifies friend information for application P1 of the user registered in friend candidate DB 723, which is not registered in friend information DB 721 in association with the user. The identified friend information will be presented to the user as friend candidate information. In the present operation example, registration unit 711 identifies user identification information "P104" and "D2" as friend candidate information to be presented to the user.

After the friend candidate information is identified, sending unit 712 sends the identified friend candidate information to application server 60, together with identification information of an application and establishing-method information, which correspond to the identified friend candidate information (Sd8).

Receiving unit 611 of application server 60 receives the information including the friend candidate information sent by friend function providing server 70. When the information is received by receiving unit 611, sending unit 612 sends the information to communication terminal 20 (Sd9).

Receiving unit 213 of communication terminal 20 receives the information including the friend candidate information sent by application server 60. When the information is received by receiving unit 213, presenting unit 214 causes touch screen 24 to display the received friend candidate information as candidate(s) for registration in friend information DB 721 of friend function providing server 70 (Sd10). When doing so, presenting unit 214 also causes touch screen 24 to display the identification information of an application and establishing-method information, which have been received together with the friend candidate information. In the present operation example, presenting unit 214 causes touch screen 24 to display a message that recommends another user "D2" as a friend candidate, together with a message stating that the user and the other user "D2" have become friends using application P3 through non-face-to-face authentication.

After the friend candidate information is displayed, if the friend candidate information is selected by the user as a subject for registration in friend information DB 721, sending unit 212 sends a friend request to the other user "D2" identified by the friend candidate information, via application server 60. If the sent friend request is approved by the other user "D2," application server 60 sends the friend candidate information to friend function providing server 70 to be registered in friend information DB 721.

The foregoing is a description of an example of a friend information mutual utilization operation performed among application server 60, friend function providing server 70, and SNS server 40.

In the operation example described above, the user of communication terminal 20, while application P1 is running, is presented with user identification information for application P1 corresponding to friend information for application P3, as a friend candidate, and the user identification information is registered. Namely, in the above operation example, friend information is mutually utilized between different applications and between different information-processing devices. Since SNS server 40 and application server 60 include different types of platforms, as described above; therefore, it can be said that friend information is mutually utilized between different types of platforms.

It is of note that in the above operation example, where application server 60 provides friend candidate information to communication terminal 20, friend function providing server 70, instead of application server 60, may provide friend candidate information directly to communication terminal 20. Also, in the above operation example, where communication terminal 20 provides sets of friend information for application P3 and establishing-method information to application server 60, SNS server 40 may provide the sets of information directly to application server 60.

2-10. Modification 10

An information-processing device according to the above embodiment, on receiving friend candidate information from friend candidate management server 10, may narrow down friend candidate information to be presented to a user. For example, the information-processing device may narrow down friend candidate information to be presented to a user, to avoid presenting friend candidate information to a user that is already registered in the device as friend information. Alternatively, the information-processing device may narrow down friend candidate information to be presented to a user, to avoid duplicate presentation of friend candidate information to a user.

What is claimed is:

1. An information-processing system comprising:
   a plurality of information-processing devices that include at least a first information-processing device, wherein the first information-processing device includes at least one hardware processor;
   a server configured to store, in non-transitory memory, a) first identification information for a first user, b) second identification information for a second user, c) sixth identification information for a first video game program, and d) data that the first user and the second user are registered as friends for the first video game program;
   based on execution of a second video game program, which is different from the first video game program, on the first information-processing device and by the first user, the first information-processing device is configured to send a message to the server that the second video game program is being played by the first user;
   the server is further configured to
      generate, based on reception of the message that the second video game program is being executed by the first user, friendship opportunity data that includes identification information for users that are not registered as friends of the first user for the second video game program, but which are registered as friends with the first user with at least one other game application program, the generated friendship opportunity data including the second identification information of the second user, and
      transmit, to the first information-processing device, the friendship opportunity data for presentation thereon; and
   the first information-processing device configured to:
      present, on a display device that is coupled to the first information-processing device, a display for friend candidates that is based on the friend opportunity data, where each friend candidate references a video game program in which the first user is registered as a friend, the display including an option to cause a friendship registration request, which is based on friend opportunity data, to be generated for friendship registration for the second video game program, wherein the friend candidates include a second friend candidate that is based on the second identification information of the second user or third identification information of the second user, and
      upon detection of selection of the second friend candidate, send the friendship registration request for obtaining an approval by the second user, wherein the second identification information of the second user is registered as a friend for the second video game program in the first information-processing device in response to the approval by the second user of the friendship registration request.

2. The information-processing system according to claim 1, wherein the server is configured to store the second identification information of the second user in association with fourth identification information for managing the second identification information of the second user and for identifying the second user.

3. The information-processing system according to claim 1, wherein:
   the first video game program and a third video game program run on different types of computing platforms; and
   wherein the second identification information of the second user is shared by multiple different application programs,
   wherein the third identification information of the second user is not shared by plural application programs.

4. The information-processing system according to claim 1, wherein the first information-processing device is configured to, in response to registration of fifth identification information of a third user performed by executing the first video game program, send the fifth identification information of the third user to the server.

5. The information-processing system according to claim 1, wherein the first information-processing device is configured to:
   automatically register the first user and another user as friends for a third video game without waiting for an instruction from the first user.

6. The information-processing system according to claim 1, wherein the server is configured to store a method in which the first user and another user were registered as friends for the first video game program.

7. The information-processing system according to claim 6, wherein the first information-processing device is configured to automatically, without waiting for an instruction from the first user, register the another user as a friend of the first user for the second video game program based on determination that the method satisfies a predetermined condition.

8. The information-processing system according to claim 1, wherein the first information-processing device is configured to, upon detecting that the second identification information of the second user has not been sent to the server, send the second identification information of the second user to the server.

9. The information-processing system according to claim 1, wherein the second identification information of the second user is used when the first video game program is running, while the third identification information for the second user is used when the second video game program is running, the second and the third identification information being different from one another.

10. The information-processing system according to claim 1, wherein the second identification information of the second user includes identification number information of the second user and user name information of the second user.

11. A server comprising:
a non-transitory storage medium configured to store a plurality of friendship data records that each include identification information for at least two users and identification information for a corresponding application in which the at least two users are registered as friends, the plurality of friendship data records including a first data record that includes first identification for a first user, second identification information for a second user, and third identification information for a first video game program in which the first identification for the first user and the second identification information for the second user are registered as friends; and
a processing system that includes at least one hardware processor, the processing system configured to:
receive, via a transceiver, a message that the first user is executing a second video game program on a first information-processing device,
in response to reception of the message, generate friendship candidates by determining, based on the stored plurality of friendship data records, which users are 1) already registered as friends with the first user for application programs other than the second video game program, and 2) not registered as friends with the first user for the second video game program,
communicate the generated friendship candidates to the first information-processing device for registration of new friend registrations to the first user and in connection with the second video game program that is being executed thereon,
receive, from the first information-processing device, a selection of at least a first friend candidate that is one of the generated friendship candidates, wherein the first friend candidate is based on the second identification information of the second user or third identification information of the second user,
generate and send, based on the selection of at least the first friend candidate, a friendship registration request for obtaining an approval by the second user for friendship registration for the second video game program, and
store, as part of the plurality of friendship data records and in response to the approval by the second user, that the first and second users are registered as friends for the second video game program.

12. An information-processing method, comprising:
storing, to non-transitory memory that is coupled to a computer system, a plurality of friendship data records that each include identification information for at least two users and identification information for a corresponding application in which the at least two users are registered as friends, the plurality of friendship data records including a first data record that includes first identification for a first user, second identification information for a second user, and third identification information for a first video game program in which the first identification for the first user and the second identification information for the second user are registered as friends;
receiving, via a transceiver that is coupled to the computer system, a message that the first user is executing a second video game program on a first information-processing device;
in response to reception of the message, generating at least one friendship candidate by determining, based on the stored plurality of friendship data records, at least one other user that is 1) already registered as friends with the first user for at least one application program other than the second video game program, and 2) not registered as friends with the first user for the second video game program, and
communicating, via the transceiver, the at least one friendship candidate to the first information-processing device for registration of new friend registrations to the first user and in connection with the second video game program that is being executed thereon;
receive, from the first information-processing device, a selection of at least a first friend candidate that is one of the at least one friendship candidate, wherein the first friend candidate is based on the second identification information of the second user or third identification information of the second user;
generate and send, based on the selection of at least the first friend candidate, a friendship registration request for obtaining an approval by the second user for friendship registration for the second video game program; and
subsequent to communication of the friendship registration request, receiving friendship registration data that the first user and the at least one other user are registered as friends for second video game program; and
updating the plurality of friendship data records based on the received friendship registration data.

13. A non-transitory storage medium storing a program for causing a computer to execute a process, the process comprising:
storing, to non-transitory memory that is coupled to the computer, a plurality of friendship data records that each include identification information for at least two users and identification information for a corresponding application in which the at least two users are registered as friends, the plurality of friendship data records including a first data record that includes first identification for a first user, second identification information for a second user, and third identification information for a first video game program in which the first identification for the first user and the second identification information for the second user are registered as friends;
receiving, via a transceiver that is coupled to the computer, a message that the first user is executing a second video game program on a first information-processing device;
in response to reception of the message, generating at least one friendship candidate by determining, based on the stored plurality of friendship data records, at least one other user that is 1) already registered as friends with the first user for at least one application program other than the second video game program, and 2) not registered as friends with the first user for the second video game program;

communicating, via the transceiver, the at least one friendship candidate to the first information-processing device for possible registration of new friend registrations to the first user and in connection with the second video game program that is being executed thereon;

receive, from the first information-processing device, a selection of at least a first friend candidate that is one of the at least one friendship candidate, wherein the first friend candidate is based on the second identification information of the second user or third identification information of the second user;

generate and send, based on the selection of at least the first friend candidate, a friendship registration request for obtaining an approval by the second user for friendship registration for the second video game program; and store, as part of the plurality of friendship data records and in response to the approval by the second user, that the first and second users are registered as friends for the second video game program.

* * * * *